(12) United States Patent
Alsop et al.

(10) Patent No.: US 12,314,588 B2
(45) Date of Patent: *May 27, 2025

(54) SYSTEM AND METHOD FOR COALESCED MULTICAST DATA TRANSFERS OVER MEMORY INTERFACES

(71) Applicant: ADVANCED MICRO DEVICES, INC., Santa Clara, CA (US)

(72) Inventors: Johnathan Alsop, Bellevue, WA (US); Nuwan Jayasena, Santa Clara, CA (US); Shaizeen Aga, Santa Clara, CA (US); Andrew McCrabb, Ann Arbor, MI (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,081

(22) Filed: Oct. 23, 2023

(65) Prior Publication Data

US 2024/0045606 A1 Feb. 8, 2024

Related U.S. Application Data

(63) Continuation of application No. 17/218,700, filed on Mar. 31, 2021, now Pat. No. 11,803,311.

(51) Int. Cl.
*G06F 3/06* (2006.01)

(52) U.S. Cl.
CPC ............ *G06F 3/064* (2013.01); *G06F 3/0604* (2013.01); *G06F 3/0644* (2013.01); *G06F 3/0659* (2013.01); *G06F 3/0679* (2013.01)

(58) Field of Classification Search
CPC ...... G06F 3/064; G06F 3/0604; G06F 3/0644; G06F 3/0659; G06F 3/0679; G06F 12/0607; G06F 2212/1016
See application file for complete search history.

(56) References Cited

U.S. PATENT DOCUMENTS

| | | | |
|---|---|---|---|
| 7,549,014 B1 | 6/2009 | Fair | |
| 8,601,214 B1 | 12/2013 | Chakalian et al. | |
| 9,137,780 B1 | 9/2015 | Olsen et al. | |
| 11,803,311 B2 * | 10/2023 | Alsop | G06F 3/0604 |
| 2007/0156946 A1 | 7/2007 | Lakshmanamurthy et al. | |

(Continued)

FOREIGN PATENT DOCUMENTS

WO 2014120193 A1 8/2014

OTHER PUBLICATIONS

Chatterjee et al., "Architecting an Energy-Efficient DRAM System for GPUs", 2017 IEEE International Symposium on High Performance Computer Architecture (HPCA), IEEE, 2017, 12 pages.

(Continued)

*Primary Examiner* — Francisco A Grullon

(57) ABSTRACT

Methods and apparatuses to control digital data transfer via a memory channel between a memory module and a processor are disclosed. At least one of the memory module or the processor coalesces a plurality of short data words into multicast coalesced block data comprising a single data block for transfer via the memory channel. Each of the plurality of short data words pertains to one of at least two partitioned memory submodules in the memory module. The multicast coalesced block data is communicated over the memory channel.

20 Claims, 12 Drawing Sheets

(56) References Cited

U.S. PATENT DOCUMENTS

| | | |
|---|---|---|
| 2012/0204069 A1 | 8/2012 | Hughes |
| 2015/0363312 A1 | 12/2015 | Zheng et al. |
| 2016/0277469 A1 | 9/2016 | Gilson et al. |
| 2018/0089087 A1 | 3/2018 | Chang et al. |
| 2018/0232181 A1 | 8/2018 | Zhou et al. |
| 2019/0324905 A1 | 10/2019 | Ros et al. |
| 2020/0195546 A1 | 6/2020 | Ibrahim et al. |
| 2020/0371918 A1 | 11/2020 | Chachad et al. |
| 2020/0371921 A1 | 11/2020 | Bhoria et al. |
| 2020/0402198 A1* | 12/2020 | Ray .................. G06F 9/544 |
| 2021/0389907 A1 | 12/2021 | Alsop et al. |
| 2022/0317876 A1 | 10/2022 | Alsop et al. |

OTHER PUBLICATIONS

International Search Report and Written Opinion, PCT/US2022/021529, Jul. 12, 2022, 9 pages.

\* cited by examiner

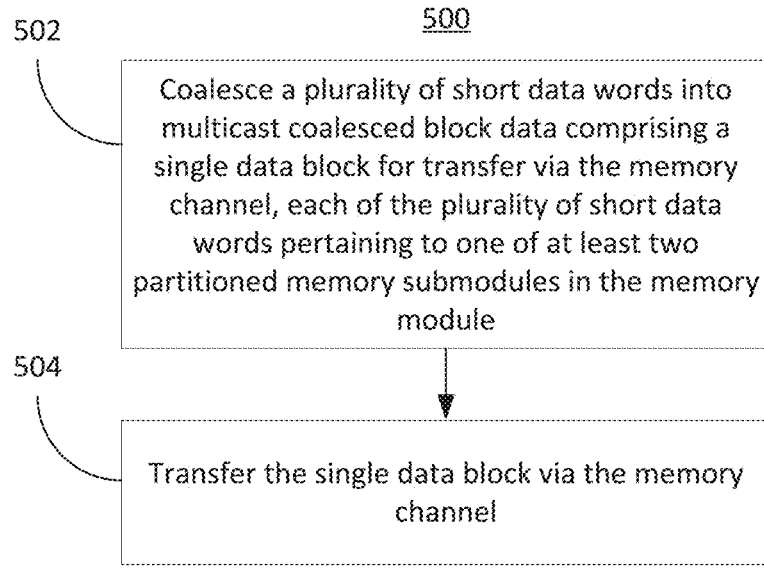
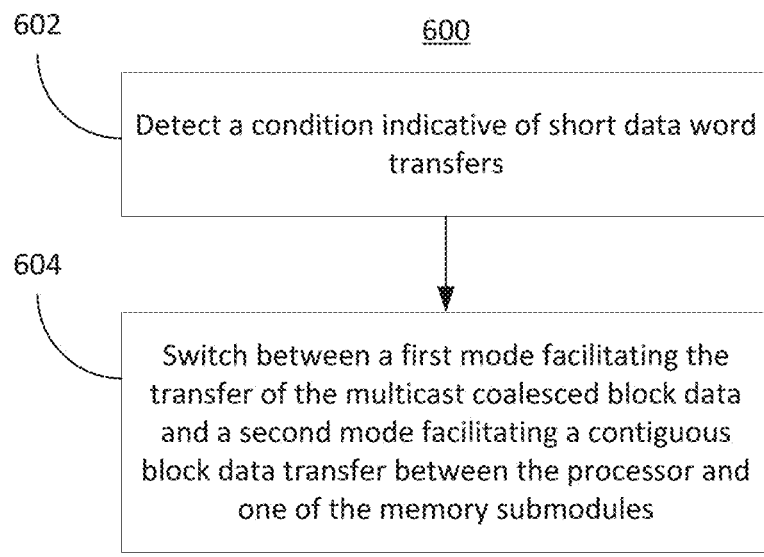

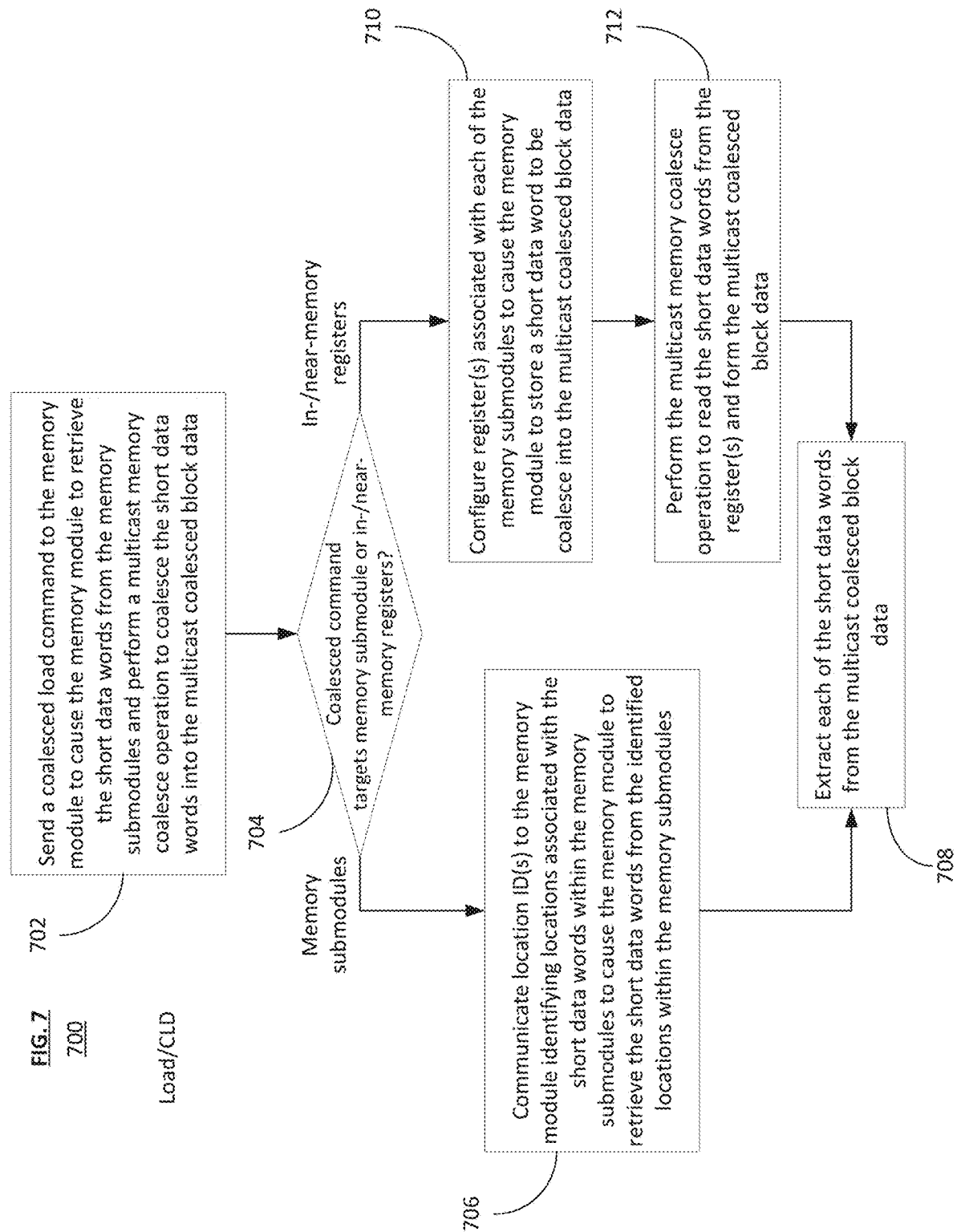

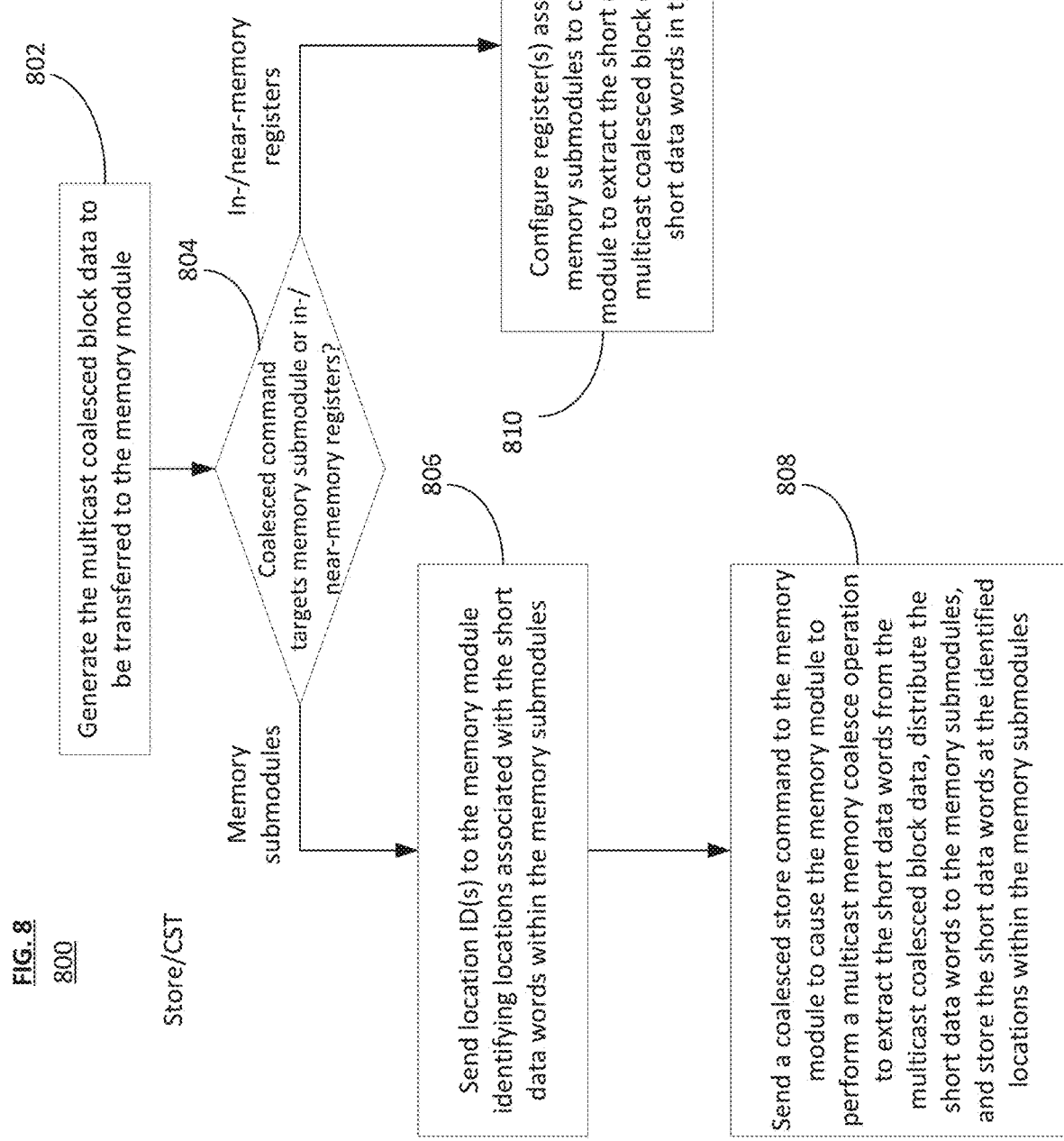

SYSTEM AND METHOD FOR COALESCED MULTICAST DATA TRANSFERS OVER MEMORY INTERFACES

CROSS-REFERENCE TO RELATED APPLICATIONS

This is a continuation application of and claims priority for patent entitled to a filing date and claiming the benefit of earlier-filed U.S. patent application Ser. No. 17/218,700, filed Mar. 31, 2021. Each patent application cited herein is hereby incorporated by reference in its entirety.

BACKGROUND OF THE DISCLOSURE

Cache memories are typically organized into cache lines in which information read from main memory or information to be written to the main memory is stored. In utilizing the information in cache memory, whether it is to read (or load) data from the cache memory or to write (or store) data to the main memory, memory interfaces are designed to read or write entire cache line(s) of information at a time, even if only a portion of the entire cache line of information is needed or only a portion of the entire cache line of information needs to be updated in the main memory. As a result, there are often many more memory transactions than needed to read requested information into cache or to write information to main memory when performing narrow data word accesses. The excess memory transactions not only consume power by increasing the overhead, but also reduce performance and cause degradation of the memory.

Some conventional memory modules typically use cache line size of 64 bytes such that each transfer of data to and/or from the memory happens in cache-line-sized bursts over a memory bus. A simplified example is shown in FIG. 1 which is a logical representation of a prior-art system implementing a wide access from a single memory bank. Commonly, a memory module 100 has a host interface 102 which couples with a memory interface 106 of a host processor 104, also referred to as a main processor which orchestrates the computation performed in the load and store operations of the memory module 100, via a memory bus or memory channel 108 of a specific width, in this case 256 bits or 32 bytes. Therefore, in some examples, the memory module 100 can only support a single coarse granularity of access (that is, 32 bytes) for any load or store operation. The memory module 100 includes a plurality of memory banks or submodules 112, 114, 116, and 118 (which in this example has 16 submodules) each operatively coupled with the host interface 102 via another memory channel 110 (which in this example has a channel width of 256 bits). Each memory submodule may include a memory address register (MAR) to store the address of the memory location that is being accessed by the load or store operation, as well as a memory data register (MDR) to store the data on which the operation is being performed. Such registers are not shown in the figures for simplicity.

The host processor 104 issues a load or store request when there is a need to load memory data from certain memory submodules or to store data into the memory submodule. When there is a data transfer between the host processor 104 and the memory module 100, such as the host processor 104 requesting certain bits of data from a specified submodule (which in this example is the submodule 114) to be sent to the host processor 104, a wide access is performed and an entire cache line of contiguous data, which includes the requested bits of data, is transferred from the single specified submodule to the host interface 102. For workloads that access data sparsely (for example, at 16-bit granularity), this can lead to significant wasted bandwidth, because whenever data is transferred across the memory interface, only a small portion of it is accessed.

Some conventional computing systems use software to statically identify such short accesses with low cache reuse potential in an attempt to address the inefficiency of sub-cache-line memory accesses. Some of the approaches involve sub-ranking, which groups the multiple memory chips of a dual in-line memory module (DIMM), or RAM stick, into subsets to allow each subset to provide a data chunk smaller than the size of the original transfers. However, sub-ranking requires separate commands for each sub-rank, resulting in reduced performance due to higher demands on a shared command bus, or increased hardware cost due to the dedicated command path required for each sub-rank. Sub-ranking is also impractical when each data access is provided by a single memory module. Some approaches involve reducing the height and/or width of DRAM banks, but such approaches involve changing the core DRAM array design and incur high overheads.

Other approaches involve matrix-vector multiplications, sparse matrix algebra, graph analytics, and sparse machine learning, which are within the domains where the software can often predict cache reuse, or the lack thereof. However, modern memory systems still suffer the inability to leverage such information to optimize memory bandwidth utilization, and there is still room for improvement regarding memory efficiency and effective bandwidth for sparse workloads.

Therefore, it would be highly advantageous to have an improved data transfer between a memory module(s) and a host processor so as to allow for the transfers of smaller data width from the memory submodule without performing excess memory transactions.

BRIEF DESCRIPTION OF THE DRAWINGS

The implementations will be more readily understood in view of the following description when accompanied by the below figures, wherein like reference numerals represent like elements, and wherein:

FIG. 5 is a flowchart illustrating one example of a method for performing a multicast memory coalesce operation in accordance with one example set forth in the disclosure;

FIG. 6 is a flowchart illustrating one example of a method for switching between facilitating multicast memory coalesce operation and facilitating contiguous block data transfers in accordance with one example set forth in the disclosure;

FIG. 7 is a flowchart illustrating one example of a method for loading data from the memory submodules in accordance with one example set forth in the disclosure;

FIG. 8 is a flowchart illustrating one example of a method for storing data in the memory submodules in accordance with one example set forth in the disclosure;

DETAILED DESCRIPTION OF IMPLEMENTATIONS

Figure 1:
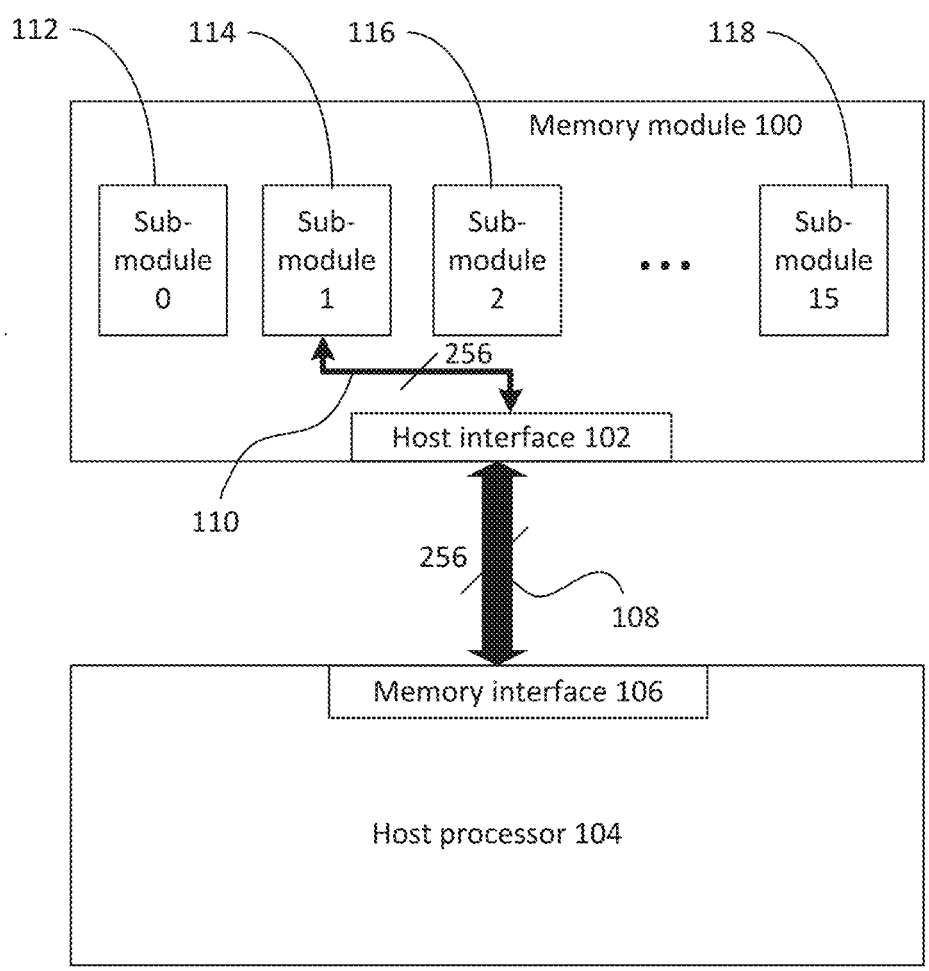
FIG. 1 is a prior art block diagram illustrating one example of a memory module and a host processor of a system in which an entire cache line of contiguous data is transferred therebetween upon the host processor issuing a load or store request.

Briefly, systems and methods help reduce the data transfer overhead and facilitate fine-grained data transfers by coalescing or aggregating short data words from a plurality of disparate memory submodules and transferring or communicating the coalesced data, referred to herein as multicast coalesced block data, over the memory channel simultaneously in a single block data transfer. In some implementations, a short data word is returned or loaded from each of a collection of partitioned memory submodules to a host processor at a unique position within the single block data transfer. In some implementations, a short data word is written or stored into each of a collection of partitioned memory submodules from a host processor at a unique position within the single block data transfer. In some examples, the memory submodules has register(s) associated therewith, where the register(s) stores the short data word from the corresponding submodule until a multicast memory coalesce operation is performed, or stores the short data words that are extracted from the multicast coalesced block data that is received from the processor. In some examples, the register(s) may be implemented as part of near-memory or in-memory processing technologies.

According to certain implementations, a method for controlling digital data transfer via a memory channel between a memory module and a processor, carried out by at least one of the memory module or the processor, coalesces a plurality of short data words into multicast coalesced block data comprising a single data block for transfer via the memory channel. Each of the plurality of short data words pertains to one of at least two partitioned memory submodules in the memory module. The multicast coalesced block data is communicated over the memory channel.

In some examples, the method includes the processor detecting a condition indicative of potential for short data word coalescing and, responsive to the detected condition, switching between a first mode facilitating the transfer of the multicast coalesced block data and a second mode facilitating a contiguous block data transfer between the processor and one of the memory submodules.

In some examples, the method includes the processor sending a coalesced load command to the memory module to cause the memory module to retrieve the short data words from the memory submodules and perform a multicast memory coalesce operation to coalesce the short data words into the multicast coalesced block data and, responsive to receiving the multicast coalesced block data, extracting each of the short data words from the multicast coalesced block data. In certain examples, the method includes the processor sending one or more location identifiers to the memory module identifying a plurality of locations associated with the short data words within the memory submodules to cause the memory module to retrieve the short data words from the identified locations within the memory submodules. In some examples, the method includes the processor sending one location identifier such that the memory module retrieves the short data words from the same location (e.g., address offset or near-memory register ID) within multiple memory submodules and coalesces the retrieved short data words into a single data block as the multicast coalesced block data. In some examples, the plurality of locations are associated with or identified by a plurality of location identifiers.

In some embodiments, the method includes the processor configuring at least one register associated with each of the memory submodules to store the short data words accessible by the processor to be coalesce into the multicast coalesced block data. In some examples, the method includes the processor generating the multicast coalesced block data to be transferred to the memory module and sending a coalesced store command to the memory module. The coalesced store command causes the memory module to perform a multicast memory extract operation to extract the short data words from the multicast coalesced block data, distribute the short data words to the memory submodules, and store the short data words within the memory submodules. In certain examples, the method includes the processor sending one or more location identifiers to the memory module identifying a plurality of locations associated with the short data words within the memory submodules to cause the memory module to store the short data words at the identified locations within the memory submodules. In another example, the method includes the processor sending one location identifier such that the memory module stores the short data words in the coalesced data block to the same location (address offset or near-memory register ID) within multiple memory submodules.

In some examples, the method includes the processor generating the multicast coalesced block data to be transferred to the memory module and configuring at least one register associated with the memory submodules to cause the memory module to extract the short data words from the multicast coalesced block data and store the short data words in the at least one register. In some examples, the method includes the processor generating the multicast coalesced block data to be transferred to the memory module and configuring the memory module to cause the memory module to determine one or more location identifiers identifying a plurality of locations associated with the short data words within the memory submodules based on the multicast coalesced block data supplied by the processor or information stored in the memory module.

According to certain implementations, a processor includes a memory interface which communicates with a memory module via a memory channel and multicast coalesce logic. The multicast coalesce logic performs data transfer between the processor and the memory module via the memory channel by causing a plurality of short data words to be coalesced into multicast coalesced block data comprising a single data block prior to the transfer, and communicates the multicast coalesced block data over the memory channel. Each of the plurality of short data words pertains to one of at least two partitioned memory submodules.

In some examples, the multicast coalesce logic configures a memory controller associated with the memory submodules to cause the memory controller to detect a condition to switch between a first mode facilitating the transfer of the multicast coalesced block data and a second mode facilitating a contiguous block data transfer between the processor and one of the memory submodules, the condition indicative of potential for short data word coalescing.

In some examples, the multicast coalesce logic sends a coalesced load command to the memory module to cause the memory module to retrieve the short data words from the memory submodules and perform a multicast memory coalesce operation to coalesce the short data words into the multicast coalesced block data and, responsive to receiving the multicast coalesced block data, extracts each of the short data words from the multicast coalesced block data. In certain examples, the multicast coalesce logic also sends one or more location identifiers to the memory module identifying a plurality of locations associated with the short data words within the memory submodules to cause the memory module to retrieve the short data words from the identified locations within the memory submodules.

In some examples, the multicast coalesce logic configures at least one register associated with the memory submodules to cause the memory module to read the short data words from the memory submodules and perform a multicast memory coalesce operation to coalesce the short data words from the register(s) into the multicast coalesced block data. In some examples, the register(s) may be per-submodule near-memory register(s) or per-submodule in-memory register(s), and in performing the multicast memory coalesce operation, the short data words stored in the register(s) from a prior in-memory or near-memory operation are retrieved and coalesced into a single data block.

In some examples, the multicast coalesce logic generates the multicast coalesced block data to be transferred to the memory module and sends a coalesced store command to the memory module to cause the memory module to perform a multicast memory extract operation to extract the short data words from the multicast coalesced block data, distribute the short data words to the memory submodules, and store the short data words within the memory submodules. In certain examples, the multicast coalesce logic also sends one or more location identifiers to the memory module identifying a plurality of locations associated with the short data words within the memory submodules to cause the memory module to store the short data words at the identified locations within the memory submodules.

In some examples, the multicast coalesce logic generates the multicast coalesced block data to be transferred to the memory module and configures at least one register associated with the memory submodules to cause the memory module to extract the short data words from the multicast coalesced block data and store the short data words in the register(s). The register(s) may be per-submodule near-memory register(s) or per-submodule in-memory register(s).

According to certain implementations, a memory module includes a processor interface which communicates with a processor via a memory channel, a plurality of partitioned memory submodules, and multicast coalesce logic. The multicast coalesce logic performs data transfer between the processor and the memory module via the memory channel by causing a plurality of short data words to be coalesced into coalesced block data comprising a single data block prior to the transfer, and communicating the multicast coalesced block data over the memory channel. Each of the plurality of short data words pertains to one of the memory submodules.

In some examples, the memory module includes a mode selection component, including but not limited to tri-state gates or multiplexer, that switches between a first mode facilitating the transfer of the multicast coalesced data and a second mode facilitating a contiguous block data transfer between the processor and one of the memory submodules. In certain examples, the memory module also includes a memory controller associated with the memory submodules, the memory controller which detects a condition indicative of potential for short data word coalescing to switch between the first mode and the second mode.

In some examples, the memory module includes at least one near-memory or in-memory processing logic which determines one or more location identifiers identifying a plurality of locations associated with the short data words within the memory submodules based on the multicast coalesced block data supplied by the processor or information stored in the memory module.

In some examples, the multicast coalesce logic of the memory module includes a plurality of shifter logic components coupled with the memory submodules. Each of the shifter logic components shifts a position of the short data word based on an address offset for the memory submodule. The short data words from the shifter logic components are concatenated to form the multicast coalesced block data. In certain examples, the multicast coalesce logic, in response to receiving from the processor a coalesced load command, retrieves the short data words from the memory submodules and perform a multicast memory coalesce operation by shifting the positions of the short data words using the shifter logic components and coalescing the short data words into the multicast coalesced block data. In certain examples, the multicast coalesce logic receives one or more location identifiers from the processor identifying a plurality of locations associated with the short data words within the memory submodules such that the short data words are retrieved from the identified locations within the memory submodules.

In some examples, the multicast coalesce logic further includes a plurality of selector logic components. Each of the selector logic components selects the short data word from a portion of data retrieved from one of the memory submodules based on the address offset from the memory submodule. The short data words from the selector logic components are concatenated to form the multicast coalesced block data.

In some examples, the memory module includes at least one register associated with the memory submodules. The register stores a short data word associated with the corresponding memory submodule until a multicast memory coalesce operation is performed to coalesce the short data words from the register into the multicast coalesced block data. In some examples, each of the short data words may have been previously loaded from the corresponding memory submodule, or it may have been computed by in-memory or near-memory processing logic based on the data stored in the submodule.

In some examples, the multicast coalesce logic of the memory module includes a plurality of subset distribute logic components coupled with the memory submodules. Each of the subset driver logic components extracts one of the short data words from the multicast coalesced block data and distribute the extracted short data word to one of the memory submodules. In certain examples, the multicast coalesce logic of the memory module, in response to receiving from the processor a coalesced store command, performs a multicast memory extract operation to store within the memory submodules the short data words distributed to the memory submodules by the subset distribute logic components. In certain examples, the multicast coalesce logic further receives one or more location identifiers from the processor identifying a plurality of locations associated with the short data words within the memory submodules such that the short data words are stored at the identified locations within the memory submodules.

In some examples, the memory module includes at least one register associated with the memory submodules. The register stores the short data words extracted from the multicast coalesced block data that is received from the processor. In some examples, subsequent memory command(s) may perform a memory operation using the short data words in the registers and/or the short data words in the associated memory submodules. In some examples, the multicast coalesce logic performs a multicast memory extract operation to extract and distribute the short data words from the register to the memory submodules and store the short data words within the memory submodules.

According to some implementations, a system for controlling digital data transfer includes a processor, a memory module including a plurality of partitioned memory submodules, a memory channel between the processor and the memory module, and a multicast coalesce logic. The multicast coalesce logic performs data transfer between the processor and the memory module via the memory channel by causing a plurality of short data words to be coalesced into multicast coalesced block data comprising a single data block prior to the transfer, and communicating the multicast coalesced block data over the memory channel. Each of the plurality of short data words pertains to one of the memory submodules. In certain examples, the system further includes a mode selection component that switches between a first mode facilitating the transfer of the multicast coalesced data and a second mode facilitating a contiguous block data transfer between the processor and one of the memory submodules, and a memory controller associated with the memory submodules. The memory controller detects a condition indicative of potential for short data word coalescing and control the mode selection component to switch between the first mode and the second mode based on the detected condition.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 2:
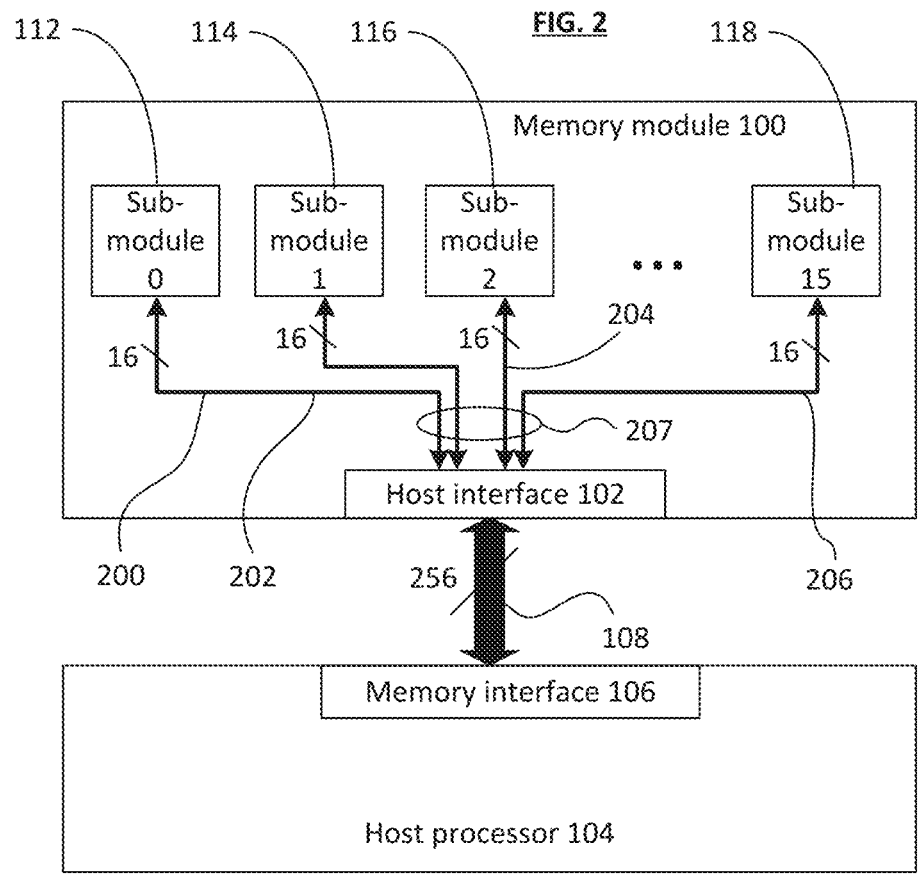
FIG. 2 is a block diagram illustrating one example of a memory module and a host processor of a system configured to perform multicast memory coalesce operations in accordance with an embodiment set forth in the disclosure.
Figure 4:
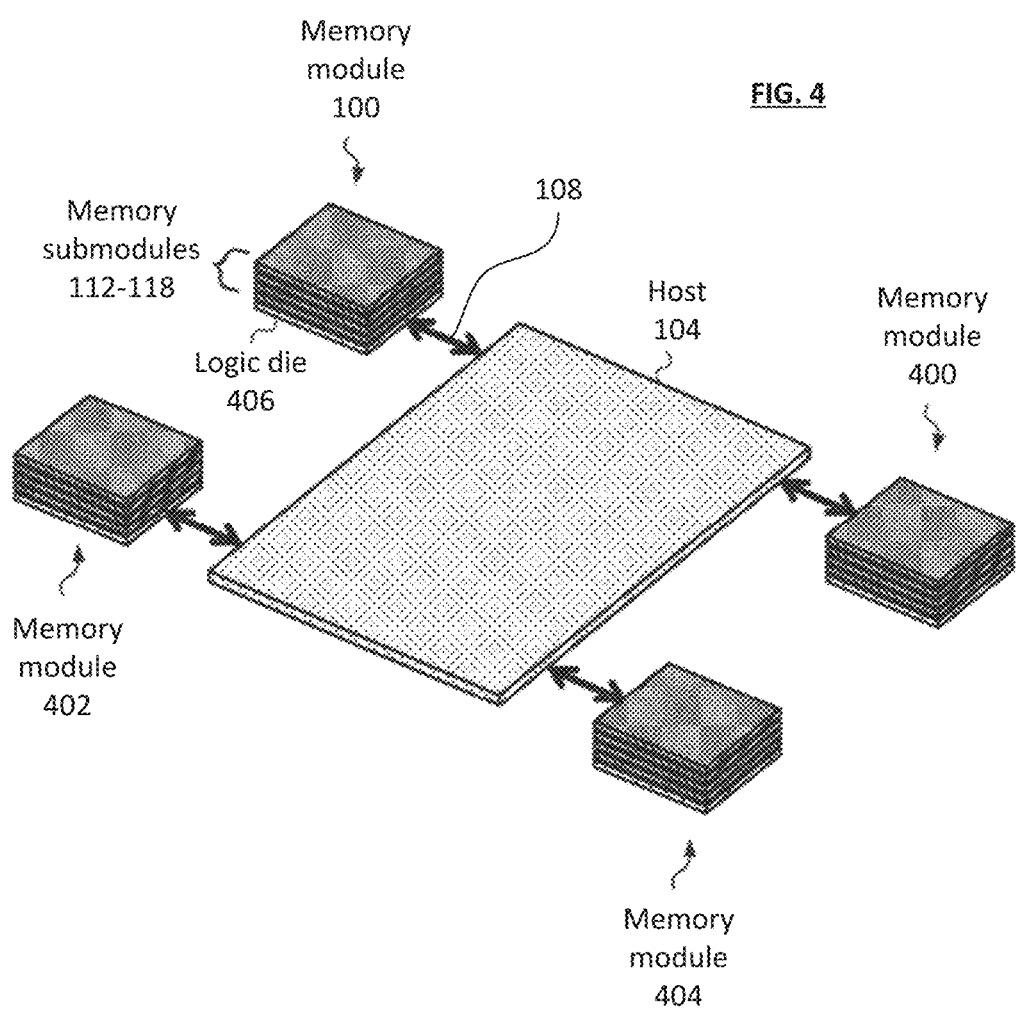
FIG. 4 is a diagram illustrating one example of the system according to FIG. 2 with a plurality of memory modules coupled with the host processor.

FIG. 2 illustrates a logical representation of one example of a system, or more specifically a computing system such as a portion of a hardware server, smartphone, wearable, printer, laptop, desktop, or any other suitable computing device that utilizes data transfers between a memory module 100 and a host processor 104. A single memory module and a single memory channel is shown for simplicity, but it is to be understood that the disclosure also applies to systems with multiple memory modules and channels. In this example, the memory module 100 may be the main memory of the host processor 104, which may be a central processing unit (CPU), graphics processing unit (GPU), accelerated processing unit (APU), application specific integrated circuit (ASIC), or any other suitable integrated circuit that performs computations and issues memory requests to the memory module 100. Cache storage may also exist on the host processor, the memory module, or both. It is to be understood that any number of memory modules may be coupled with the host processor 104, as shown in FIG. 4, and the system may also implement a plurality of host processors 104 operatively coupled together.

The memory submodules may also be referred to herein as memory banks. The memory submodules 112, 114, 116, and 118 are disparate and operatively coupled with the host interface 102 via a plurality of memory channels or data links 200, 202, 204, and 206 for short data word transfer. In the example where there are 16 submodules, there may be 16 short data word links where each short data word link facilitates short data word transfer of 16 bits, for example, and each memory link operates independently from other links. The links may each occupy a subsection of a shared memory channel such as a shared memory data bus 207. The data links 200, 202, 204, and 206 have smaller channel width than the memory channel 108 such that the total combined width of all the data links 200, 202, 204, and 206 equals the width of the memory channel 108.

In the example shown, the memory module 100 includes 16 short word links, each having a width of 16 bits, totaling 256 bits, which equals the width of the memory channel 108. It is to be understood that other links may exist to couple the memory submodules with the host interface 102. For example, each the submodules may also be operatively coupled with the host interface 102 via the memory channel 110 as shown in FIG. 1, in which case the memory channel 110, which has a greater channel width than any of the data links 200, 202, 204, and 206, is used for contiguous block data transfer instead of a multicast coalesced block data transfer, the details of which is further disclosed herein.

The systems and methods as disclosed herein are described in the context that the memory submodules share access to a memory channel to receive a broadcast instruction stream from the host processor. However, it should be apparent to those skilled in the art that the techniques as disclosed herein may also extend to other forms of memory submodule groupings receiving broadcast instructions.

Figure 3:
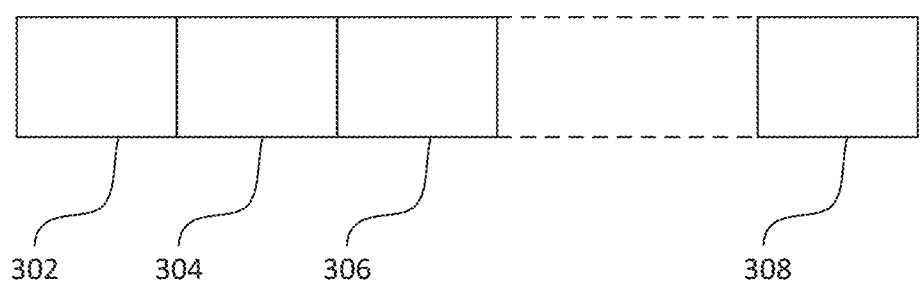
FIG. 3 is a block diagram illustrating one example of a multicast coalesced block data that is formed as result of the multicast memory coalesce operations carried out by the system shown in FIG. 2.

FIG. 3 illustrates one example of multicast coalesced block data 300 that is to be transferred via the memory channel 110 between the memory module 100 and the host processor 104. The block data 300 includes data segments 302, 304, 306, and 308 such that each data segment pertains to or is associated with a separate memory submodule. That is, in the case of a load command, each data segment is a short data word retrieved from one of the memory submodules in one-to-one correlation, i.e., each memory submodule may contribute no more than one short data word to the block data 300. In the case of a store command, each data segment is a short data word that is to be stored in a location within one of the memory submodules in one-to-one correlation, i.e., each memory submodule may receive no more than one short data word from the block data 300 to be stored therein. Each short data word may have any suitable word size, for example 8 bits, 16 bits, 32 bits, 64 bits, etc., that is smaller than the channel width and the cache line width, depending on the number of memory submodules in the memory module.

In the exemplary system shown in FIG. 2, the block data 300 to be transferred includes 16 data segments, each segment having 16 bits, and each segment is assigned to no more than one of the memory submodules. For example, the data segment 302 may be assigned to the memory submodule 112, the data segment 304 to the memory submodule 114, the data segment 306 to the memory submodule 116, and the data segment 308 to the memory submodule 118, and so on. For illustrative purposes only, when a CLD facilitates each memory submodule (which in some examples may include the PIM unit) to return 16 bits of data, calculated by dividing 256 bits (data transfer width of the memory interface of a single channel) by 16 memory submodules. Therefore, data from the memory submodule 112 may occupy bits 0 to 15 of the block data 300, data from the memory submodule 114 may occupy bits 16 to 31 of the block data 300, data from the memory submodule 116 may occupy bits 32 to 47 of the block data 300, and so forth, until data from the memory submodule 118 may occupy bits 240 to 255 of the block data 300. The block data 300 is then transferred or communicated over the memory channel 108 in a single block data transfer between the memory module 100 and the host processor 104. The block data 300 is also referred to as multicast coalesced block data due to the nature of the block data including a plurality of separate short data words that are addressed to a plurality of separate and independently functioning memory submodules, and the separate short data words are transferred simultaneously in a single block data transfer when the multicast coalesced block data is sent via the memory channel.

FIG. 4 illustrates one example of a system with a plurality of memory modules 100, 400, 402, and 404, each of which is operatively coupled with the host processor 104 via the memory channel 108. Each memory module may include one or more memory dies and one or more logic dies with built-in computation capabilities provided by processing-near-memory (PNM) technologies. For example, the computation capabilities of memory module 100 may be implemented on a separate logic die 406 which is 3D-stacked with the memory die(s), and the memory die(s) may be implemented with the memory submodules 112, 114, 116, and 118. The memory submodules 112, 114, 116, and 118, also referred to as memory banks, may be dynamic random access memory (DRAM) devices in some examples. Each of the other memory modules 400, 402, and 404 may be similarly constructed. The implementations described herein are also applicable to cases where the computation capabilities (that is, computing units) are incorporated at each memory bank or memory module, as in bank-level processing-in-memory (PIM) systems. For example, the computing units may be implemented directly on the memory dies instead of on the separate logic die. In order to overcome command bandwidth limitations between the host and PIM units, the stream of commands may be broadcast to multiple PIM units within a memory module. An example implementation of such an organization is for each PIM command to be broadcast to all the memory banks associated with a single memory channel. Still further, the implementations described herein are also applicable in other system configurations that may consist of multiple host processors and memory modules interconnected in various configurations.

In certain embodiments, a non-transitory storage medium, such as memory, includes executable instructions that when executed by one or more processors, such as the host processor 104 or the memory module 100 with data processing capabilities, causes the one or more processors to perform the methods for controlling digital data transfer via a memory channel as disclosed in FIGS. 5 through 8.

FIG. 5 illustrates a method 500 of performing the coalesced block data transfer, as performed by the host processor 104, or by the memory module 100 having either logic die(s) with built-in computation capabilities as provided by PNM or memory dies with built-in computation capabilities as provided by PIM where each memory die has its own independent computation capabilities. In step 502, the processor or the memory module coalesces a plurality of short data words into the multicast coalesced block data. The multicast coalesced block data includes a single data block for transfer via the memory channel, where each of the short data words pertains to one of at least two partitioned memory submodules in the memory module. In some examples, the short data words are associated with a subset of the memory submodules such that the short data words are either loaded from specific locations within the memory submodules or stored in the specific locations within the memory submodules. In step 504, the single data block containing the plurality of short data words is transferred via the memory channel in a single data transfer. The transfer may be from the processor to the memory module or from the memory module to the processor.

FIG. 6 illustrates a method 600 of switching between different modes in the system, where one mode facilitates the formation and transfer of the multicast coalesced block data between the processor and at least two of the memory submodules as explained in method 500, and the other mode facilitates the contiguous block data transfer between the processor and a single memory submodule. In step 602, the processor detects a condition indicative of potential for short data word coalescing. In step 604, responsive to the detected condition, the memory module or the processor switches between a first mode facilitating the transfer of the multicast coalesced block data and a second mode facilitating a contiguous block data transfer between the processor and one of the memory submodules.

In some implementations, the processes of detecting the condition and issuing a command to switch between the first and second modes take place entirely on the host side at the memory interface of the host processor. Although the multicast memory coalesce operation to coalesce the short data words associated with the plurality of memory submodules may occur on the memory side at the host interface of the memory module (i.e., when a coalesced load command is issued by the processor), the host processor is responsible for detecting the condition and issuing multicast coalescing requests to the memory module, which may be issued as part of the coalesced load command.

In some implementations, the condition is explicitly triggered by an application running on the processor or instructions issued by the application (e.g., a special memory command to "start coalescing", or explicit coalesced memory commands issued by the application which trigger coalescing). In some implementations, the condition includes an indication of a sparse memory access operation at the memory interface. The sparse memory access is defined as accessing a smaller number of bits of data (e.g., a short data word) sparsely at two or more of the memory submodules, as opposed to a contiguous memory access in which a single contiguous section of a larger number of bits of data (e.g., an entire cache line or data block) is to be accessed at a single memory submodule. For example, the memory interface may include a memory controller which stores a sequence of memory commands from the processor into queues such that there is a separate queue for each memory submodule. The memory controller may detect a hint or indication that a command at the front of each queue is comprised of memory commands for sparse bits or short data words, and in response to the detection, the sparse bits or short data words from the queues are concatenated or coalesced into the multicast coalesced block data.

In some implementations, the memory controller may store a sequence of memory commands into a single memory queue. In this case, the condition may be detected by periodically searching the queue for memory commands to short data words that map to different memory submodules. Additionally or alternatively, the queue may be searched when inserting a memory command to short data words for other commands of the same or similar type to short data words in different submodules with which it may be coalesced. A threshold in the number of coalesce-able commands may be implemented to trigger the condition. If coalescing is limited to short data words that share some address offset bits (e.g., the short data words fall in the same DRAM column index), the address bits are also compared when searching for coalescing opportunities. In such implementations, the queue entries may also contain information regarding whether the associated memory command targets a short data word, information regarding whether multiple short data words have been coalesced into the queue entry, and offset information regarding the short data word(s) targeted by the queue entry.

FIG. 7 illustrates a method 700 of performing a coalesced memory load operation by the processor. In step 702, the processor sends a coalesced load command to the memory module. The command causes the memory module to retrieve the short data words from the memory submodules and perform a multicast memory coalesce operation to coalesce the short data words into the coalesced block data. In step 704, the processor determines whether the coalesced command directly targets the memory submodules, or whether the command targets in-memory or near-memory registers. In some examples, the type of command that is being coalesced specifies whether the memory submodules or the in-memory or near-memory registers are targeted.

If the coalesced command targets the memory submodules, in step 706, the processor communicates one or more location identifiers to the memory module. The one or more location identifiers identify the plurality of locations associated with the short data words within the memory submodules. The processor may cause the memory module to retrieve the short data words from the identified locations within the memory submodules. The short data words are coalesced into the multicast coalesced block data prior to be transferred as a single data block via the memory channel. Subsequently, in step 708, the processor extracts (or de-coalesces) each of the short data words from the multicast coalesced block data, in response to receiving the multicast coalesced block data.

If the coalesced memory command targets the in-memory or near-memory registers, in step 710, the processor configures at least one register associated with each of the memory submodules to cause the memory module to store a short data word to be coalesced into the coalesced block data. In some embodiments, a register is implemented for every memory submodule and can be directly accessed. If the same register and same offset within the register is accessed for every memory submodule, then, according to some examples, it may not be necessary to supply location information for each of the short data words. Placing the short data words in the registers may be orchestrated in advance by the processor by performing memory-local load commands from the memory submodules in some examples. In some examples, the placement of the short data words in the registers may be orchestrated by processing each of the short data words (for example, performing calculations on the short data words) using the near-memory or in-memory processing capabilities of the memory module. In step 712, the multicast memory coalesce operation is performed by the processor to read the short data words from the register(s) and form the multicast coalesced block data, before proceeding to step 708.

FIG. 8 illustrates a method 800 of performing a coalesced memory store operation by the processor. In step 802, the processor generates the multicast coalesced block data to be transferred to the memory module. In step 804, the processor determines whether the coalesced commands directly target the memory submodules, or whether the commands target the in-memory or near-memory registers.

If the coalesced memory command targets the memory submodules, in step 806, the processor sends one or more location identifiers to the memory module. The location identifiers identify the locations associated with the short data words within the memory submodules, which causes the memory module to store the short data words at the identified locations within the memory submodules. In step 808, the processor sends a coalesced store command to the memory module. The command causes the memory module to perform a multicast memory extract operation to extract the short data words from the multicast coalesced block data, distribute the short data words to the memory submodules, and store the short data words at the identified locations within the memory submodules. The steps 806 and 808 may be performed sequentially or simultaneously. In some examples, the location identifier(s) may be generated or computed by the in-memory or near-memory processing logic component based on data stored in the per-submodule register or the memory submodule.

If the coalesced memory command targets in-memory or near-memory registers, the processor proceeds to step 810 to configure at least one register associated with the memory submodules to cause the memory module to extract the short data words from the multicast coalesced block data and store the short data words in the at least one register. For example, after the short data words are stored to the register(s) local to the memory submodules, the memory submodule's near-memory or in-memory computing component may access the register(s) for further computation and/or data movement.

In methods 700 and 800, the location identifier(s) may be communicated by using number bits in the coalesced load/store command and/or data bus to transmit per-submodule location bits. Alternatively, the location identifier(s) may be obtained by computing per-submodule location information, for example by loading the location identifier(s) and/or computing the location identifier(s) near-memory and subsequently storing it in a near-memory register. In some examples, the location information that is static or common to all memory submodules may not require to be transmitted separately. For example, additional per-submodule location bits may be added to a common base address, and no additional location information may to be provided if a coalesced command targets a short data word at the same offset in each memory submodule or near-memory register.

Any of the logic components as disclosed herein, such as those shown in FIGS. 9 through 14, may be implemented as discrete logic, one or more state machines, a field programmable gate array (FPGA), or any suitable combination of processors/processing logic components executing instructions and other hardware. According to embodiments, a logic device or component includes devices or components that are able to perform a logical operation, e.g., an apparatus able to perform a Boolean logical operation. It will be recognized that functional blocks are shown and that the various operations may be combined or separated as desired. It will also be recognized that all the functional blocks are not needed in all implementations. The arrows shown in the figures define the directions of data transfer between the components during the specified loading or storing operation, which may be implemented using any suitable data path, such as via hardwiring or a data channel such as a data bus. Some implementations may also involve pipelining of transfers/operations in which the data is buffered in one or more registers. Furthermore, for simplicity, the embodiments described herein pertain to a memory module 100 that is high bandwidth memory (HBM) where an entire cache line of data access is provided from a single memory module.

It is to be understood that the disclosure is applicable to other types of memory where multiple memory modules contribute to a single data access. In such cases, the coalescing of multiple short data elements (that is, short data words) into a single data block may occur within each participating memory module. Furthermore, it is to be understood that although the figures are presented in the context of an example system with 16 memory banks or submodules and a memory channel interface with a data width of 256 bits for block data transfer via the single channel (that is, the size of data transferred with each load or store operation to the channel), other implementations of the system are possible with different parameters such as more or less memory submodules and/or wider or narrower memory channel, among others.

Figure 9:
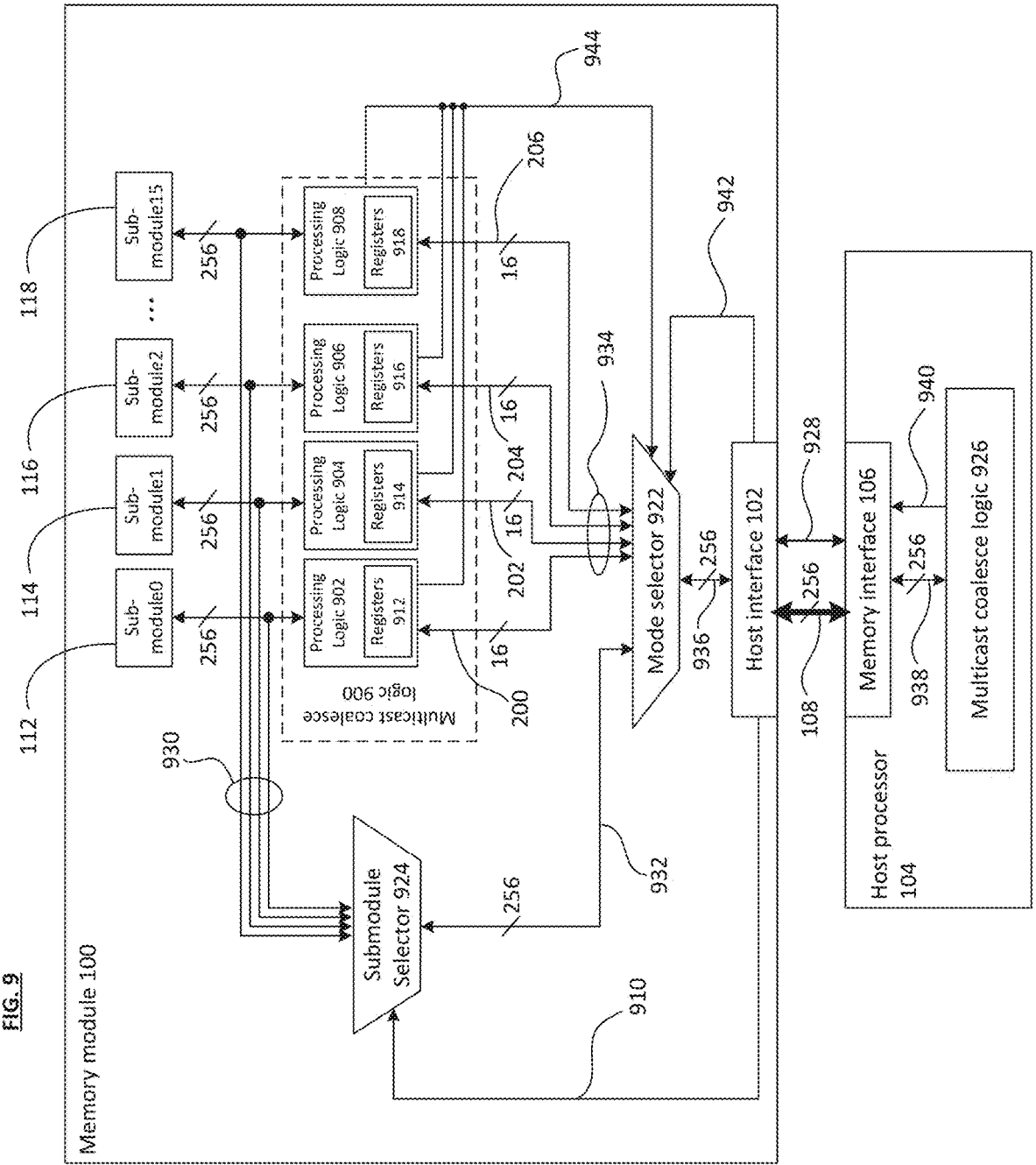
FIG. 9 is a diagram illustrating one example of a system in accordance with one example set forth in the disclosure.

FIG. 9 illustrates one example of a system, or more specifically a computing system that utilizes data transfers between a memory module 100 and a host processor 104. In this example, the memory module 100 includes a multicast coalesce logic 900 which includes a plurality of processing logic components 902, 904, 906, 908 with a plurality of registers 912, 914, 916, 918, where each processor and register is associated with one of the memory submodules 112, 114, 116, 118. The processing logic 902, 904, 906, 908 are the near-memory or in-memory computing components configured to provide computing capabilities for the memory submodules. The multicast coalesce logic 900 is coupled with the data links 200, 202, 204, 206 such that the short data words are transferred via the data links 200, 202, 204, 206 through a shared data bus, or a data channel 934.

For illustrative purposes only, the short word data to be received from or sent to the processing logic 902 may occupy bits 0 to 15 of the data channel 934, the short word data to be received from or sent to the processing logic 904 may occupy bits 16 to 31 of the data channel 934, the short word data to be received from or sent to the processing logic 906 may occupy bits 32 to 47 of the data channel 934, and so forth, until the short word data to be received from or sent to the processing logic 908 may occupy bits 240 to 255 of the data channel 934. In some embodiments, the processing logic 902, 904, 906, 908 may include enough processing capabilities to support a coalesced load (CLD) and coalesced store (CST) operations and may be dedicated for supporting only such operations.

The memory module 100 further includes a mode selector 922, a mode selection component which may be implemented as tri-state gates or a multiplexer, for example. The mode selector 922 operates as a switch between a first mode facilitating the transfer of the multicast coalesced block data and a second mode facilitating a contiguous block data transfer, as explained. The mode selector 922 may be implemented as a programmable logic device such that a control bit is utilized to activate the switching. The control bit may be a coalescing configuration bit 942 as provided by the host processor 104. The mode selector 922 is configured to transfer data through the data channel 934 while in the first mode and transfer data to and from a memory submodule selector 924 while in the second mode. The memory submodule selector 924 is shared by all the memory submodules and is configured to select which submodule to access based on a memory submodule identifier (ID) 910 provided, when the mode selector 922 is operating in the second mode. Each of the mode selector 922 and the submodule selector 924, according to some embodiments, may be implemented as a single logic component in a single central location (as shown in the figures). Alternatively, in some embodiments, one or both of the mode selector 922 and the submodule selector 924 may be implemented in a distributed manner such that the mode selector 922 and/or the submodule selector 924 includes a plurality of separately functioning logic components, with at least one logic component disposed near each of the memory submodules to control the access to a single shared data channel or data bus by the memory submodules. In some examples, the logic components may include, but are not limited to, multiplexers or tri-state gates.

The host processor 104 also includes a multicast coalesce logic 926 separate from the multicast coalesce logic 900 of the memory module 100 and therefore has a different functionality. Examples of performing a multicast coalesced block data transfer are described in detail below, in view of the components mentioned above.

In some implementations of the CLD operation, for PIM-implemented systems, a PIM register identifier is specified for the PIM unit associated with each memory bank or submodule, utilizing PIM support. Each of the PIM units contributes the short data word (e.g., 16 bits) of the identified register to the coalesced output. In cases where the register is wider than the length of the short data word, some embodiments may return the lower 16 bits of the register or some other fixed offset of the register. In other embodiments, the CLD operation may have a parameter that allows the software on the host to specify which 16 bits of the register each PIM unit should return. In other embodiments, the register can be programmed at the PIM unit a priori before the CLD operation is issued.

In some of the other implementations, the CLD operation may specify a memory address within each memory bank or submodule such that each memory submodule reads the short word data (e.g., 16 bits) stored at the specified memory location and returns it. In one embodiment, this is achieved by each memory module receiving a broadcast intra-module memory address as part of the CLD operation and returning the data at that location in each memory submodule. In other embodiments, this utilizes support for communicating additional address information to each memory submodule. This may be achieved via bank-local address generation or by enhancing the command interface, e.g., by using the data bus to send command information, or alternatively by coalescing commands that share target address bits.

In the CLD operation, in response to a command broadcast to a collection of memory submodules, the memory submodules each returns to the requesting host a chunk or block of data at a fixed, unique position within the wide load data return of the memory interface. As each memory submodule returns data in a specific and unique location within the data returned to the host, all the participating memory submodules return their data in a single block data transfer over the memory data bus or channel.

Specifically, during the CLD operation according to some examples, the host processor 104 specifies the submodule-specific registers 912, 914, 916, 918 associated with the memory submodules 112, 114, 116, 118 to access. Each of the in-memory or near-memory processing logic components 902, 904, 906, 908 contributes a short data word of a predetermined word length (for example, 16 bits in the illustrated example) as stored in the corresponding register to be output to the host interface 102 via a data channels 934 and 936.

In cases where the register 912, 914, 916, 918 is wider than the word length of the short data word, in some embodiments, the lower 16 bits (or the number of bits pertaining to the length of the short data word) are returned, or alternatively other offsets may be employed to retrieve the short data words from different locations in the registers. In some embodiments, upon initiating the CLD operation, the host processor 104 may issue a command specifying which bits of the register each of processing logic 902, 904, 906, 908 should return. In some embodiments, the registers 912, 914, 916, 918 may be populated with the short data words by the corresponding processing logic 902, 904, 906, 908 by retrieving the short data words via memory channels 930 a priori before the CLD operation is issued by the host processor 104. As shown, the memory channels 930 are wider (for example, 256 bits) than the data links 200, 202, 204, 206 because the same channels may be used to transfer block data between the submodules 112, 114, 116, 118 and the memory bank selector 924 as well.

In some examples, after the registers 912, 914, 916, 918 are populated with the short data words from their corresponding memory submodules 112, 114, 116, 118, the processing logic 902, 904, 906, 908 transfer the short data words via the data channel 934 as multicast coalesced block data. When the mode selector 922 switches to the first mode facilitating multicast coalesced block data transfer, the host processor 104 can retrieve the block data via the data channel 934. Otherwise, when the mode selector 922 switches to the second mode facilitating contiguous block data transfer, the host processor 104 can retrieve contiguous block data via another data channel 932 from one of the memory submodules 112, 114, 116, 118 as determined by the submodule ID 910 provided by the host processor 104.

Responsive to receiving the multicast coalesced block data via the memory channel 108, the host processor 104 transfers the block data via an internal data channel 938 to the multicast coalesce logic 926 to extract the short data words from the block data to be processed accordingly. The multicast coalesce logic 926, therefore, is also capable of operating as an extractor or de-coalescing component, and the multicast coalesce logic 900 in the memory module 100 is also capable of performing such operation, as further explained herein with regard to a coalesced store operation.

In some implementations of the CST operation, for PIM-implemented systems, a PIM register identifier is specified for the PIM unit associated with each memory bank or submodule, utilizing PIM support. Each of the PIM units writes the short data word received from the coalesced input to the identified register. In cases where the register is wider than the length of the short data word (e.g., 16 bits), some embodiments may store or perform a PIM operation on the data in the lower 16 bits and zero out the remaining bits, for example via masking. Other embodiments may sign extend the 16-bit short data word and store or perform a PIM operation with the extended data targeting the specified PIM register. In yet other embodiments, the CST operation may have a parameter that allows the software on the host to specify to which 16 bits of the register that each PIM unit is to write the corresponding data. In other embodiments, the register can be programmed at the PIM unit a priori before the CST operation is issued.

In some of the other implementations, the CST operation may specify a memory address within each memory bank or submodule such that each memory submodule writes the short word data (e.g., 16 bits) to the specified memory location. In one embodiment, this is achieved by each memory module receiving a broadcast intra-module memory address as part of the CST operation and storing the data at that location in each memory submodule. In other embodiments, this utilizes support for communicating additional address information to each memory submodule. This may be achieved via bank-local address generation or by enhancing the command interface, e.g., by using the data bus to send command information, or alternatively by coalescing commands that share target address bits.

Specifically, in some examples, the host processor 104 transfers data in the opposite direction from the CLD operation such that the multicast coalesce logic 926 performs the coalescing of multiple short data words to be transferred to the memory module 100 as a single block of data (or a single write operation), after which the short data words are extracted and distributed across the memory submodules 112, 114, 116, 118. As an illustrative example, the data distribution may be performed as follows: data from bits 0 to 15 of the host-provided multicast coalesced block data is sent to the submodule 112, data from bits 16 to 31 of the host-provided multicast coalesced block data is sent to the submodule 114, data from bits 32 to 47 of the host-provided multicast coalesced block data is sent to the submodule 116, and so forth, until data from bits 240 to 255 of the host-provided multicast coalesced block data is sent to the submodule 118.

In some embodiments, the CST operation specifies the registers 912, 914, 916, 918 associated with the submodules 112, 114, 116, 118, and the corresponding processing logic 902, 904, 906, 908 write the short data words (for example, 16 bits) extracted from the multicast coalesced block data to be stored into the registers 912, 914, 916, 198.

In cases where the register 912, 914, 916, 918 is wider than the word length of the short data word, in some embodiments, the short data word may be stored in the lower 16 bits (or the number of bits pertaining to the length of the short data word) while leaving the remaining bits as 0. In some embodiments, a sign extension operation is performed on the short data words to extend the data length thereof before storing it or performing a processing operation by the processor, with the extended data targeting the specified register 912, 914, 916, 918. In other embodiments, the CST operation may have a parameter that allows the host to specify which of the bits that are stored in the registers 912, 914, 916, 918 should be written by the processing logic 902, 904, 906, 908 into the corresponding memory submodules 112, 114, 116, 118.

In both of the CLD and CST operations, the host processor 104 may provide instructions regarding the operation of the mode selector 922 and the submodule selector 924. For example, the multicast coalesce logic 926 may initiate a command or instruction 940 to switch the mode selector 922 from the second mode facilitating contiguous block data transfer to the first mode facilitating multicast coalesced block data transfer when providing the CLD or CST operation via a command channel or command bus 928. The instruction to switch to the first mode may be as simple as activating a control bit in the mode selector 922, such that the first mode is activated when the control bit is 1, and the second mode is activated when the control bit is 0, for example. Otherwise, if the host processor 104 intends to switch the mode selector 922 back to the second mode (for example, after the multicast coalesced block data transfer is complete), this can be achieved by toggling the control bit.

In some embodiments, the near-memory or in-memory processing logic components 902, 904, 906, 908 are capable of determining one or more location identifiers (for example, address bits such as column indices of memory arrays) identifying the specific locations associated with the short data words within the memory submodules 112, 114, 116, 118 based on the multicast coalesced block data supplied by the host processor 104 or the information stored in the memory module 100, for example in the registers 912, 914, 916, 918. Furthermore, although FIG. 9 illustrates each memory submodule associated with its own near-memory or in-memory processor, in some embodiments, the processing capabilities of a single near-memory or in-memory processor may be shared among a plurality of memory submodules.

In some embodiments, the instruction to switch between the two aforementioned modes may be provided by the near-memory or in-memory processor(s), as shown by the transfer of a coalescing configuration bit 944 from a near-memory storage, for example from any of the processing logic components 902, 904, 906, 908. The processor may update his near-memory storage value whenever it determines a condition to switch between coalesced mode and contiguous mode. For example, the processor(s) may be capable of detecting a condition indicative of potential for a multicast coalesced block data transfer, such as those previously explained herein. Furthermore, some implementations may also involve pipelining of transfers/operations in which the data is buffered in one or more intermediate buffer registers, for example the block data register 1102 shown in FIGS. 11 to 14, which may be disposed between the mode selector 922 and the multicast coalesce logic 900.

Figure 10:
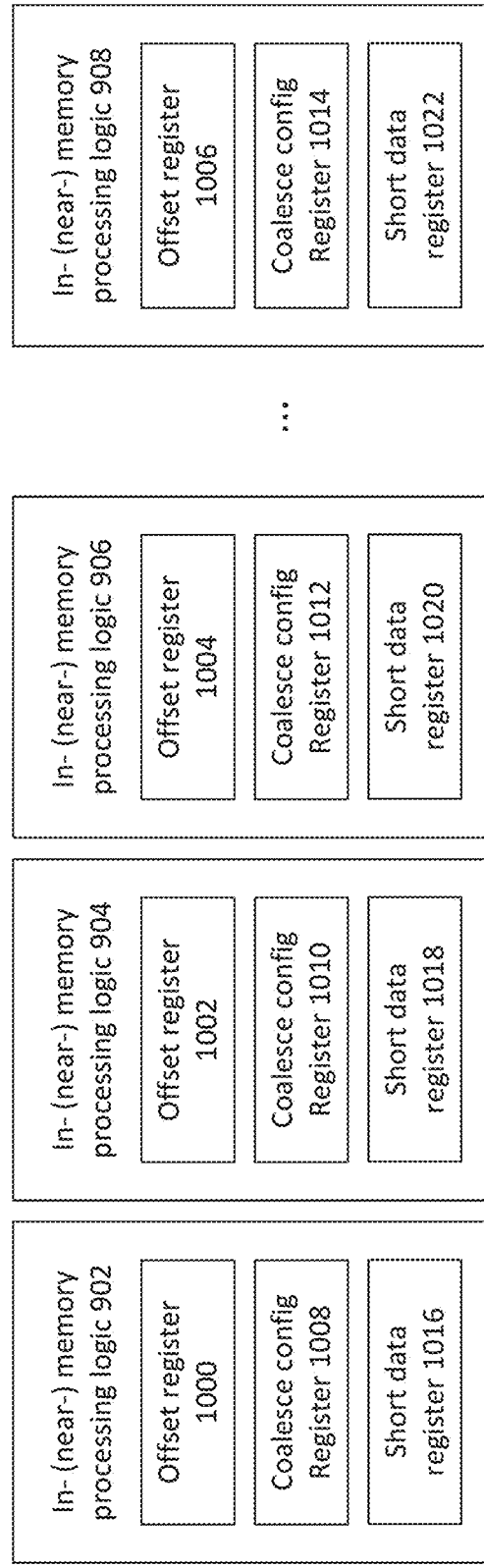
FIG. 10 is a diagram illustrating one example of a memory module in accordance with one example set forth in the disclosure.

FIG. 10 illustrates the different types of registers which may be utilized by the processing logic components 902, 904, 906, 908 as part of the multicast coalesce logic 900. In some embodiments, an offset register 1000, 1002, 1004, 1006 may be implemented to store the offset information for the short data word that is either loaded from or to be stored in the corresponding submodule. For example, in the CLD operation, the offset register 1000, 1002, 1004, 1006 may store a specific address offset for the short data word when it is being coalesced with the other short data words into the multicast coalesced block data (such as the short data word from the memory submodule 112 occupying bits 0 to 15, the short data word from the memory submodule 114 occupying bits 16 to 31, and so forth). Each address offset is different and unique to the corresponding memory submodule in order to avoid an short data word entry overwriting another short data word entry due to an unintended overlap of the occupied bits.

Furthermore, in the CST operation, the address offset may help the processing logic 902, 904, 906, 908 identify which bits of the multicast coalesced block data to retrieve the short data word from in order to store the retrieved short data word in the corresponding memory submodule 112, 114, 116, 118.

In some embodiments, the offset register 1000, 1002, 1004, 1006 contains a plurality of offset information such that when the processor supplies a base address, the processing logic 902, 904, 906, 908 can calculate the unique location information associated with each of the plurality of memory submodules based on the stored offset information and the provided base address. The offset values stored in the register may be preprogrammed or stored a priori before the CLD or CST operation is issued by the host processor 104.

In some embodiments, a coalesce configuration register 1008, 1010, 1012, 1014 may be implemented to store data regarding the mode to be selected by the mode selector 922, as determined by the processing logic components 902, 904, 906, 908 in response to detecting conditions indicative of a multicast coalesced block data transfer. The register may indicate a single bit, where the first mode is activated when the bit is 1, and the second mode is activated when the bit is 0. Short data registers 1016, 1018, 1020, 1022 are the registers which store the short data word to be coalesced into the multicast coalesced block data during the CLD operations or to be stored in the corresponding memory submodule 112, 114, 116, 118 during the CST operations. In some examples, the CLD operation reads from the short data registers 1016, 1018, 1020, 1022 (or one or more per-submodule near-memory registers) to obtain the short data words, in which case the short data words are already stored in the registers as a result of a prior near-memory processing operation. Therefore, the short data words may be stored a priori in these short data registers before the operation is issued.

Figure 11:
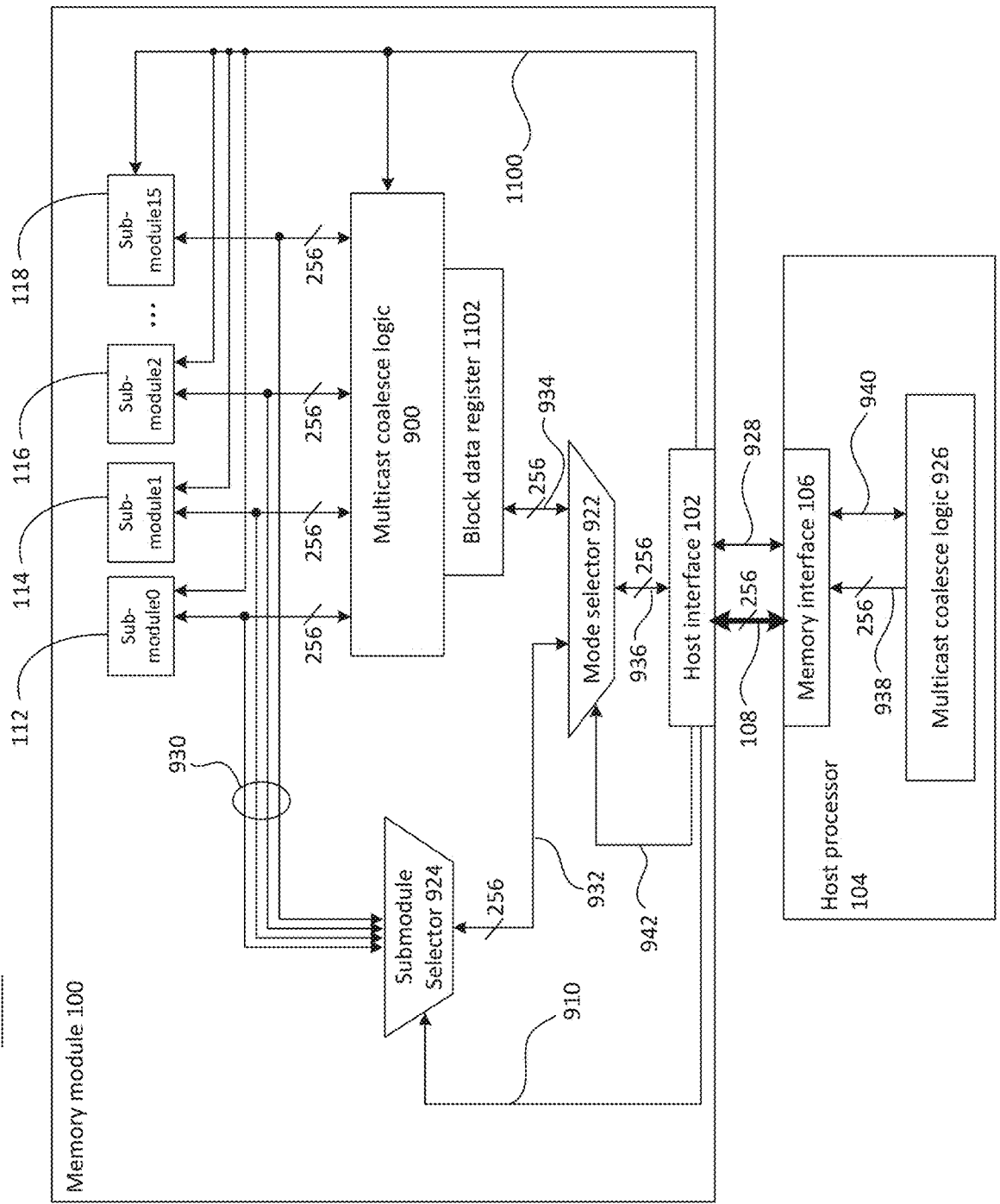
FIG. 11 is a diagram illustrating one example of a system in accordance with one example set forth in the disclosure.
Figure 12:
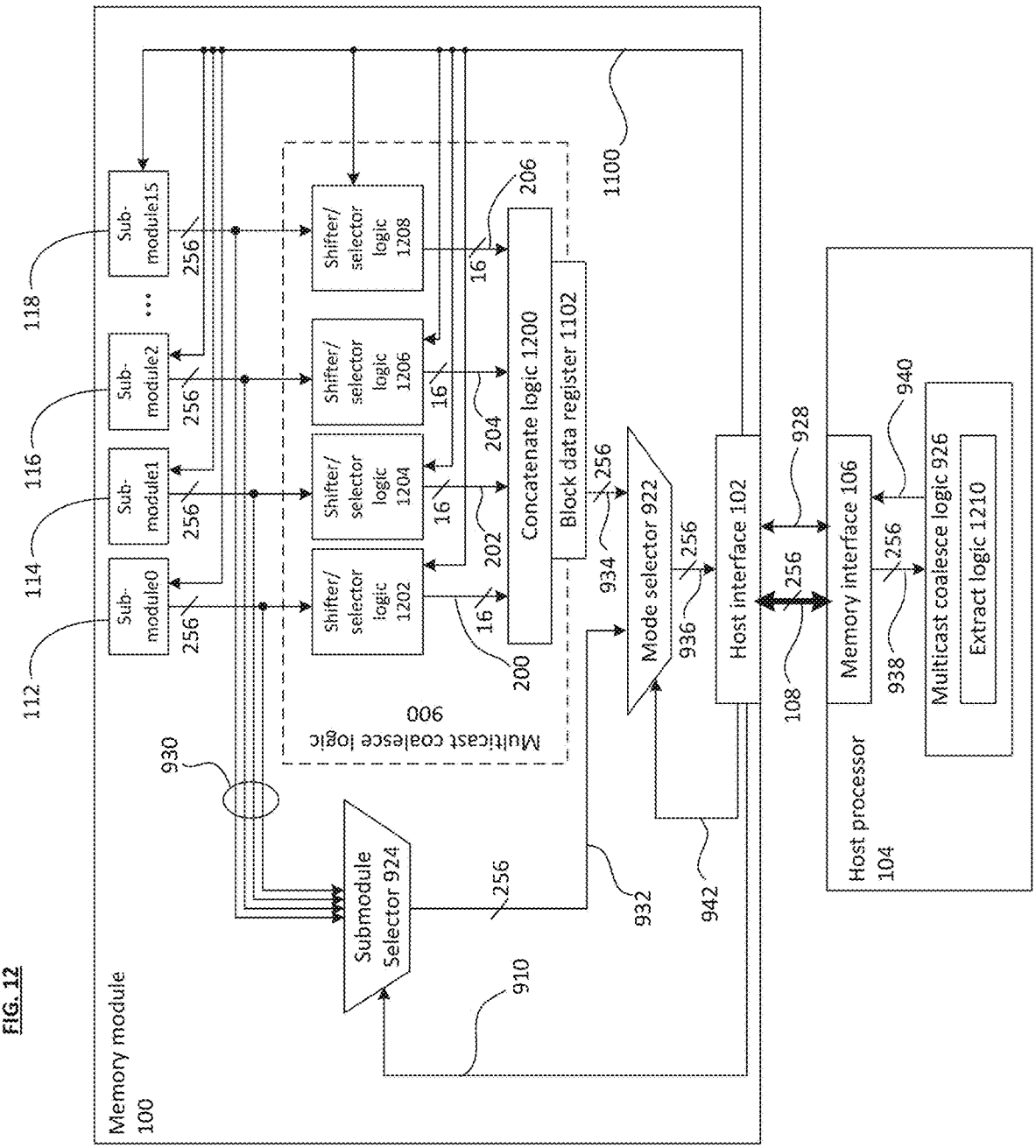
FIG. 12 is a diagram illustrating one example of a system in accordance with one example set forth in the disclosure.
Figure 13:
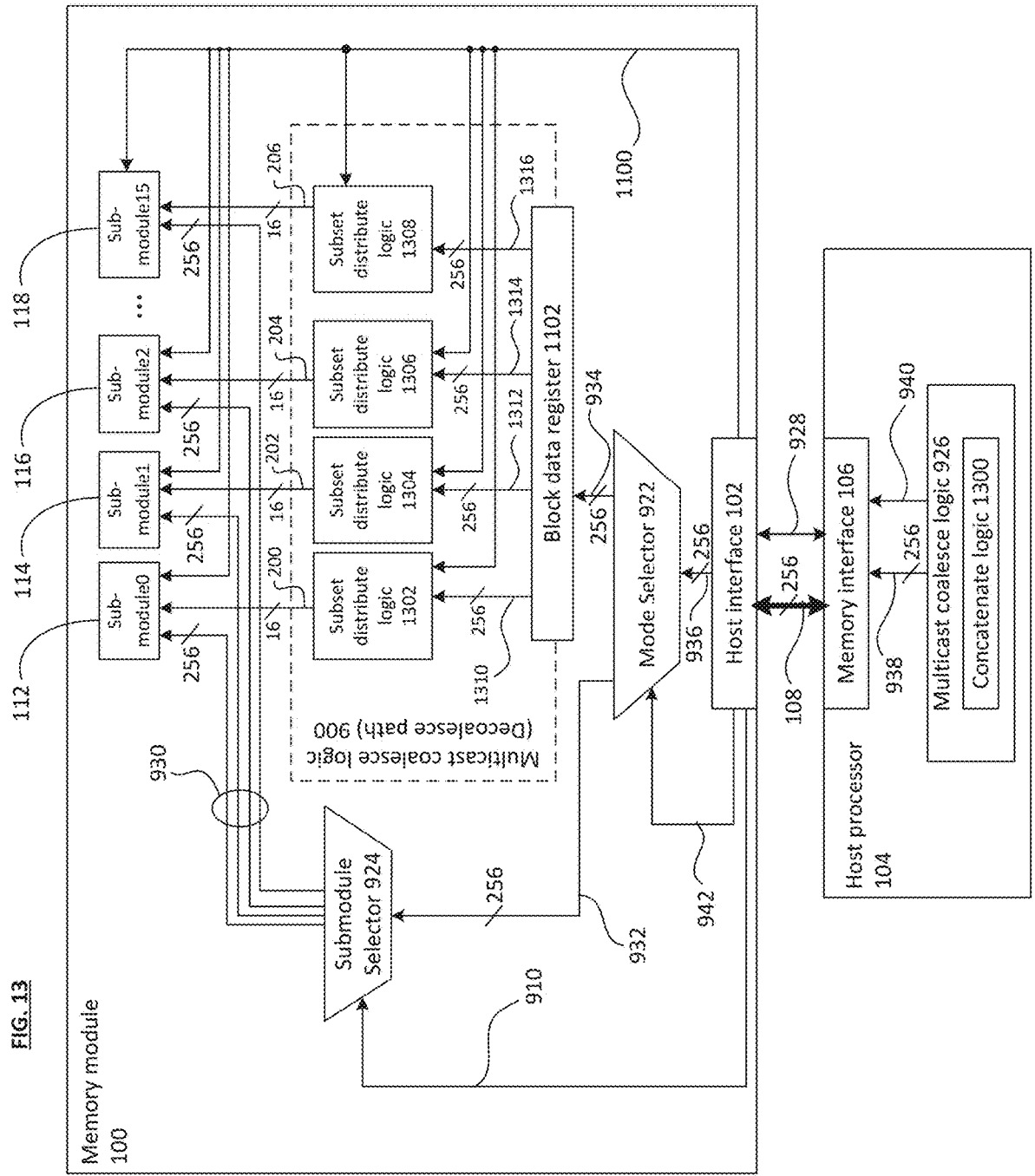
FIG. 13 is a diagram illustrating one example of a system in accordance with one example set forth in the disclosure.
Figure 14:
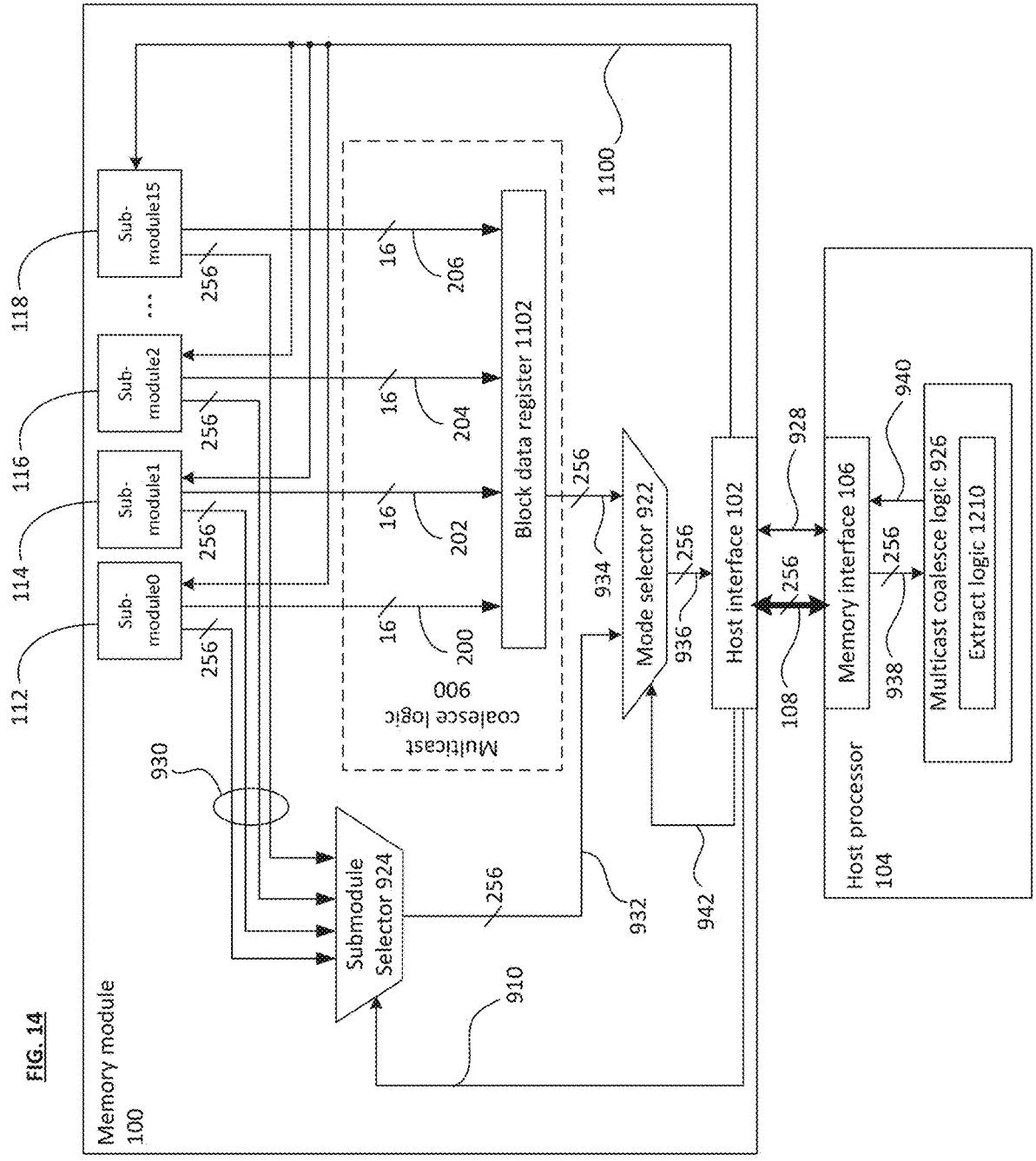
FIG. 14 is a diagram illustrating one example of a system in accordance with one example set forth in the disclosure.

FIG. 11 illustrates one example of a computing system that utilizes data transfers between a memory module 100 and a host processor 104. In this example, the host processor 104 provides the instruction to operate the mode selector 922, the address offset for each of the short data words, and the location address for each of the memory submodules 112, 114, 116, 118. Address offset and location address are sent as an instruction command 1100 to the multicast coalesce logic 900, coupled with a block data register 1102 to store the multicast coalesced block data, and the memory submodules, respectively, from the host processor 104. The address offset defines how much a position of the short data word is shifted during the multicast coalescing operation, and the location address defines the specific location within a specified memory submodule (for example, a column index of a memory array within the memory submodule) that is to be accessed for the CLD or CST operations. In some examples, near-memory integer adders may be implemented to generate the location addresses for the memory submodules. FIGS. 12 and 14 illustrate the dataflow within the system shown in FIG. 11 during the CLD operations, and FIG. 13 illustrates the dataflow within the system during the CST operations.

FIG. 12 illustrates one example of a system operating the CLD operation, where the multicast coalesce logic 900 includes a concatenate logic 1200 coupled with address shift components, which in this example is shifter/selector logic 1202, 1204, 1206, 1208, which may be programmable, configured to receive the data to loaded from the memory submodules 112, 114, 116, 118. The shifter/selector logic 1202, 1204, 1206, 1208 is configured to receive contiguous block data from the corresponding memory submodule 112, 114, 116, 118. The shifter/selector logic 1202, 1204, 1206, 1208 is then configured to (1) select the short data word from the contiguous block data to store in the block data register 1102, or (2) shift the short data word by an address offset before storing the short data word in the block data register 1102.

If the selector logic (1) is implemented, the short data word is selected using the predetermined address offset without performing address shifting. If the shifter logic (2) is used, the short data words are separately shifted using the respective offsets into the first predetermined number of bits, and the predetermined number of bits, starting with the first bit, are selected to obtain the short data words. The stored short data words are coalesced using the concatenate logic 1200, which performs string concatenation to join the short data words end-to-end.

Although not shown, the shifter/selector logic 1202, 1204, 1206, 1208 may include register(s) configured to store the location address (to determine which bits or location within the contiguous block data should be selected as the short data word) and/or the address offset value (to determine the amount of shifting to be performed on the short data word prior to coalescing).

Short data word extraction logic 1210 may be implemented in the host processor 104 to extract the individual short data words from the multicast coalesced block data after receiving the same via the memory channel 108 in a single block data transfer. Each shifter/selector logic 1202, 1204, 1206, 1208 may receive the address offset information in the instruction command 1100 provided by the host processor 104, where the address offset information defines where the short data word from each memory submodule is to be located in the multicast coalesced block data. Each memory submodule 112, 114, 116, 118 may receive the location address information in the instruction command 1100 to store in the memory address register the location from which the short data word is to be retrieved.

FIG. 13 illustrates one example of a system operating the CST operation, where the host processor 104 includes concatenate logic 1300 to form the multicast coalesced block data including short data words that are to be stored in a plurality of the memory submodules 112, 114, 116, 118. The multicast coalesce logic 900, which in this case receives the multicast coalesced block data via a de-coalescing path, includes subset distribution logic 1302, 1304, 1306, 1308 to distribute the short data words to their respective memory submodules as intended by the host processor 104. In some examples, the subset distribution log further implements additional address offset bits communicated from the multicast coalesce logic to the memory submodule to indicate which short data word(s) needs to be written, as well as to prevent writing other bits in the column index of the memory array.

The block data register 1102 stores the multicast coalesced block data received from the host processor 104, and the stored data is transferred to each subset distribution logic 1302, 1304, 1306, 1038 via a data channel 1310, 1312, 1314, 1316. Each subset distribute logic may receive the address offset information in the instruction command 1100 provided by the host processor 104, where the address offset information defines which bits within the multicast coalesced block data is to be distributed to which memory submodule. In some examples, each subset distribute logic may be utilized to drive a subset of the data stored in the block data register 1102. Each memory submodule 112, 114, 116, 118 may receive the location address information in the instruction command 1100 to store in the memory address register the location in which the short data word is to be stored.

FIG. 14 illustrates one example of a system operating the CLD operation, where the shifter/selector logic 1202, 1204, 1206, 1208 from FIG. 12 is excluded from the multicast coalesce logic 900. Instead, the address offset of the short data word from the corresponding memory submodule 112, 114, 116, 118 within the block data register 1102 are configurable a priori or predetermined. That is, the offset of the short data word may be a static offset, in which case a data connection to the appropriate bits within the block data register 1102 may be hardwired (thus forming the address shift components) such that the address bits of the short data word from each memory submodule are automatically shifted to be stored in certain predetermined or preconfigured bits within the block data register 1102.

Furthermore, the concatenate logic 1200 is also excluded from the multicast coalesce logic 900. Instead of using the concatenate logic 1200 to control the coalescing of the short data words into a single block of data to be stored in the block data register 1102 as did FIG. 12, the position-shifted short data words from the memory submodules 112, 114, 116, 118 are concatenated together by joining wires from these memory submodules directly into a data bus to transfer the bits of the short data words to the block data register 1102.

In some embodiments, the CLD and CST operations may be performed by communicating partial command information via the data bus rather than the command bus. For example, in the CLD operation involving the memory module 100 with PNM or PIM capabilities as shown in FIG. 9, the short data words combined may occupy a portion of the multicast coalesced block data, such that the remaining portion of the block data is used to store other information such as the address bits for each of the short data words. Similarly, in the CST operation, the address bits for each of the short data words may be implemented in a portion of the multicast coalesced block data that is not occupied by the short data words that are to be stored in the memory submodules.

In certain embodiments, a non-transitory storage medium, such as memory, includes executable instructions, commands, or address information that when executed by one or more processors, such as the host processor 104 or the PNM/PIM device, causes the one or more processors to place the short data words such that sparse accesses can be orchestrated via the CLD and CST operations to the short data word associated with the corresponding locations within each memory submodule. This may be applicable in situations with deterministic sparse access patterns, such as accesses along the secondary axes of multidimensional matrices or tensors, or where large table entries are split across memory submodules for efficient use of PNM or PIM operations, including but not limited to applications involving machine-learning-based recommendation systems. In some embodiments, the coalescing may be performed explicitly via software implementation, the executable instructions for which is stored in the non-transitory storage medium. For example, the processor that is running the software may send a pre-coalesced request which bypasses the cache, and the request is handled at a memory controller without the need for any additional hardware for coalescing.

In some embodiments, the executable instructions, when executed by the one or more processors, causes the one or more processors to send independent fine-grained sparse accesses, which are then coalesced via hardware such as discrete logic, state machines, FPGA, or any suitable combination of processors executing instructions, for example. The host processor 104 may be capable of dynamically detecting coalescing opportunities based on monitoring the data channels and memory submodules targeted by independent and concurrent accesses. The host processor or the PNM/PIM devices may also be capable of merging or coalescing independent requests (that is, CLD or CST command requesting for access to the memory submodules) and splitting the responses during the CLD or CST operations.

If sparse commands are capable of traversing a cache hierarchy, according to some examples, there may be a need to differentiate between sparse accesses and non-sparse data accesses such as contiguous block data access involving a single memory submodule, since these requests are to be handled differently by cache controller(s). In such situations, the differentiation may be facilitated by implementing an additional bit or opcode in the command, for example. In some embodiments, sparse accesses are handled differently from non-sparse data accesses because the sparse accesses do not access a full cache line of data. As such, sparse accesses may simply bypass the cache (e.g., using existing support for uncached address ranges) according to some examples. Alternatively, sparse accesses may traverse the caches but may be prevented from allocating or populating cache blocks on a miss, according to some examples. In some embodiments, caches are enhanced with a sector mask which tracks the state information at the granularity of the sparse accesses, allowing caches to store partially-valid cache blocks.

For multicast memory coalesce operations utilizing register offset information (when PNM/PIM registers are implemented) or address offset information, the command from the host processor may require additional address information as compared to a non-sparse access. This may be implemented by splitting the request into more packets, using bit masks or a byte mask to indicate which byte(s) within a cache line are accessed by a sparse command, or by sending some or all of the request along a dedicated data path, such as the command bus 928.

For systems in which the host processor is capable of dynamically detecting coalescing opportunities, the processor may be implemented with a means for merging and/or splitting the requests and responses associated with sparse memory access. In some embodiments, the coalescing operation occurs in the memory controller, where the requests are already sorted into different queues based on target memory submodule. If a sparse memory access at the front of the multiple memory submodule queues is detected, the memory controller merges the requests together and issues a single CLD or CST operation that includes all the requests associated with the memory submodules. In some embodiments, when the sparse memory access reaches the front of a bank queue, elements in the other queues (or a subset of elements in the other queues) are searched for sparse memory accesses that can be coalesced into a single memory request with the original sparse memory access. In some embodiments, sparse memory access requests are placed in separate queues, from which the sparse memory access requests are interleaved with dense memory access requests (that is, requests to access a contiguous block of data from a single memory submodule) when a threshold of coalesce-able sparse memory accesses to different submodules is reached, or when a timing threshold is exceeded.

When sending a response for requests involved in a CLD or CST operation, the memory controller may split the response and return the individual sparse memory access responses (potentially through the cache hierarchy) to the requesting processor(s). This may be accomplished by storing the response metadata (e.g., requestor ID, sparse address offset, or access granularity) for all pending sparse memory accesses in a small structure in the memory controller. When a sparse memory access response is returned from the memory module, the memory controller may split the data contents thereof into multiple response packets based on sparsity granularity, appending the stored metadata to these packets. If sparse memory access responses are returned to requestors through the cache hierarchy, caches may not allocate space for this data if the granularity of valid state tracking is greater than the sparsity granularity.

Advantages of implementing systems with the capability to perform multicast memory coalesce/extract operations as disclosed herein include increased efficiency in reading/loading metadata (e.g., the number of data elements participating in an irregular computation at each PNM/PIM device) to the host processor from a collection of PNM/PIM devices associated with the memory channel in a single load operation. Also, metadata (e.g., the different loop iteration counts) may be efficiently written/stored to a collection of PNM/PIM devices associated with the memory channel in a single store operation. The condition code (e.g., which PNM/PIM devices have data that meet a dynamically calculated, data-dependent condition) may be efficiently read or loaded from each of a collection of PNM/PIM devices associated with the memory channel in a single store operation.

Furthermore, short data words distributed across a collection of memory banks or submodules coupled with the memory channel may be efficiently loaded or stored without the need to wastefully transfer a full cache line of data from each of the memory submodules. This improves performance in many application domains such as scientific computing (e.g., high-performance computing, or HPC) and graph analytics, as well as in implementing widely-used data structures such as hash tables and set membership data structures. The systems and methods disclosed herein also provide capabilities to improve the performance of near-memory or in-memory processing technologies which often transfer short data words to or from multiple near-memory or in-memory processing units associated with memory banks or submodules. Additionally, a fine-grain operand may be efficiently provided to a plurality of memory submodules concurrently for a load operation that necessitates loading a short data word from different memory submodules and combining them with the supplied operand (e.g., for high-throughput fine-grained atomic accesses). The multicast memory coalesce operations as disclosed herein are also effective at improving the efficiency of the memory module (for example, DRAM efficiency) for sparse memory access patterns, such as those that exist in graph analytics, sparse matrix algebra, sparse machine learning models, and so on.

Although features and elements are described above in particular combinations, each feature or element can be used alone without the other features and elements or in various combinations with or without other features and elements. The apparatus described herein in some implementations are manufactured by using a computer program, software, or firmware incorporated in a non-transitory computer-readable storage medium for execution by a general-purpose computer or a processor. Examples of computer-readable storage mediums include a read-only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

As previously mentioned, systems and methods as disclosed herein help reduce the data transfer overhead by coalescing or aggregating short data words from a plurality of disparate memory submodules and transferring or communicating the multicast coalesced block data over the memory channel simultaneously in a single block data transfer. A short data word is returned or loaded from each of a collection of partitioned memory submodules to a host processor at a unique position within the single block data transfer, or is written or stored into each of a collection of partitioned memory submodules from a host processor at a unique position within the single block data transfer. Further, in some PIM architectures where execution units are associated with memory banks, it may be necessary to read or write small amounts of data between the PIM units and the main (or host) processor, for example to report data-dependent conditions or status to host processor or write loop iteration counts that can vary among PIM units. The systems and methods as disclosed herein facilitate reducing the overheads of narrow data accesses in such examples.

The above detailed description and the examples described therein have been presented for the purposes of illustration and description only and not for limitation.

What is claimed is:

1. A memory module comprising:
   a processor interface configured to communicate with a processor;
   a 3-D stacked memory comprising a plurality of memory submodules, each submodule comprising a respective short data link that communicates short data words;
   multicast coalesce logic, configured to retrieve short data words from each of the plurality of memory submodules, coalesce the retrieved short data words into multicast coalesced block data and transfer, via the processor interface, the multicast coalesced block data over a memory channel that has a larger channel width than each of the respective short data links.

2. The memory module of claim 1 wherein the multicast coalesce logic, is configured to in response to receiving a coalesced store command and multicast coalesced block data, perform a multicast memory extract operation on the multicast coalesced block data to store within each of the plurality of memory submodules respective short data words in the multicast coalesced block data.

3. The memory module of claim 1 wherein the multicast coalesce logic is configured to retrieve short data words from each of the plurality of memory submodules via a broadcast operation, in response to a multicast coalesced load command from the processor interface, and coalesce the retrieved short data words into the multicast coalesced block data comprising a single data block prior to transfer, each of the short data words pertaining to one of the memory submodules in the 3-D stacked memory.

4. The memory module of claim 1, further comprising:
   a mode selection component configured to switch between a first mode facilitating the transfer of the multicast coalesced block data and a second mode facilitating a contiguous block data transfer between the processor and one of the plurality of memory submodules.

5. The memory module of claim 4, further comprising:
   a memory controller associated with the plurality of memory submodules, the memory controller configured to detect a condition indicative of short data word transfers to switch between the first mode and the second mode.

6. The memory module of claim 1, further comprising:
   at least one near-memory or in-memory processor configured to determine one or more location identifiers identifying a plurality of locations each associated with each of the short data words within the plurality of memory submodules based on the multicast coalesced block data supplied by the processor or information stored in the memory module.

7. The memory module of claim 1, the multicast coalesce logic further comprising:
   a plurality of shifter logic components coupled with the plurality of memory submodules, each of the shifter logic components configured to shift a position of each of the short data words based on an address offset for each of the plurality of memory submodules, wherein each of the short data words from the plurality of shifter logic components are concatenated to form the multicast coalesced block data.

8. The memory module of claim 7, the multicast coalesce logic configured to:
   responsive to receiving from the processor a coalesced load command, retrieve each of the short data words from the plurality of memory submodules and perform a multicast memory coalesce operation by shifting the positions of each of the short data words using the plurality of shifter logic components and coalescing each of the plurality of short data words into the multicast coalesced block data.

9. The memory module of claim 8, the multicast coalesce logic configured to:
   receive one or more location identifiers from the processor identifying a plurality of locations each associated with each of the short data words within the plurality of memory submodules such that each of the short data words are retrieved from the identified locations within the plurality of memory submodules.

10. The memory module of claim 1, the multicast coalesce logic further comprising:
  a plurality of selector logic components, each of the selector logic components configured to select one of the plurality of short data word from a portion of data retrieved from at least one of the plurality of memory submodules based on an address offset for the at least one of the plurality of memory submodules, wherein each of the short data words from the plurality of selector logic components are concatenated to form the multicast coalesced block data.

11. The memory module of claim 1, further comprising:
  at least one register associated with the plurality of memory submodules, the at least one register configured to store each of the short data words associated with a corresponding memory submodule until a multicast memory coalesce operation is performed to coalesce each of the short data words from the at least one register into the multicast coalesced block data.

12. The memory module of claim 1, the multicast coalesce logic further comprising:
  a plurality of subset distribute logic components coupled with the plurality of memory submodules, each of the subset distribute logic components configured to extract one of the short data words from the multicast coalesced block data and distribute the extracted short data word to one of the plurality of memory submodules.

13. The memory module of claim 12, the multicast coalesce logic configured to:
  responsive to receiving from the processor a coalesced store command, perform a multicast memory extract operation to store within the plurality of memory submodules the short data words distributed to the plurality of memory submodules by the plurality of subset distribute logic components.

14. The memory module of claim 13, the multicast coalesce logic further configured to:
  receive one or more location identifiers from the processor identifying a plurality of locations each associated with each of the short data words within the plurality of memory submodules such that each of the short data words are stored at a respective one of the identified locations within the plurality of memory submodules.

15. The memory module of claim 1, further comprising:
  at least one register associated with the plurality of memory submodules, the at least one register configured to store each of the short data words extracted from the multicast coalesced block data that is received from the processor, and
  the multicast coalesce logic configured to perform a multicast memory extract operation to extract and distribute each of the short data words from the at least one register to the plurality of memory submodules and store the extracted short data words within the plurality of memory submodules.

16. A system for controlling digital data transfer, comprising:
  a processor;
  a memory module comprising a 3-D stacked memory comprising a plurality of memory submodules, each submodule comprising a respective short data link that communicates short data words;
  a memory channel configured between the processor and the memory module; and
  multicast coalesce logic, configured to retrieve short data words from each of the plurality of memory submodules, coalesce the retrieved short data words into multicast coalesced block data and transfer the multicast coalesced block data over the memory channel that has a larger channel width than each of the short data links.

17. The system of claim 16, further comprising:
  a mode selection component configured to switch between a first mode facilitating the transfer of the multicast coalesced block data and a second mode facilitating a contiguous block data transfer between the processor and one of the plurality of memory submodules; and
  a memory controller associated with the plurality of memory submodules, the memory controller configured to detect a condition indicative of short data word transfers and control the mode selection component to switch between the first mode and the second mode based on the detected condition.

18. The system of claim 16 wherein the multicast coalesce logic, is configured to in response to receiving a coalesced store command and multicast coalesced block data, perform a multicast memory extract operation on the multicast coalesced block data to store within each of the plurality of memory submodules respective short data words in the received multicast coalesced block data.

19. The system of claim 16 wherein the multicast coalesce logic is configured to retrieve short data words from each of the plurality of memory submodules via a broadcast operation, in response to a multicast coalesced load command, and coalesce the retrieved short data words into multicast coalesced block data comprising a single data block prior to transfer, each of the short data words pertaining to one of the memory submodules in the 3-D stacked memory.

20. The system of claim 16, the multicast coalesce logic further comprising:
  a plurality of shifter logic components coupled with at least two of the plurality of memory submodules, each of the shifter logic components configured to shift a position of each of the short data words based on an address offset for each of the at least two memory submodules, wherein each of the short data words from the shifter logic components are concatenated to form the multicast coalesced block data.

* * * * *